(12) United States Patent
Nishiguchi et al.

(10) Patent No.: US 12,044,885 B2
(45) Date of Patent: Jul. 23, 2024

(54) JIG FOR FUSION SPLICER AND HEATING METHOD

(71) Applicant: Fujikura Ltd., Tokyo (JP)

(72) Inventors: Keisuke Nishiguchi, Chiba (JP); Ririka Seino, Chiba (JP)

(73) Assignee: Fujikura Ltd., Tokyo (JP)

( * ) Notice: Subject to any disclaimer, the term of this patent is extended or adjusted under 35 U.S.C. 154(b) by 78 days.

(21) Appl. No.: 17/908,447

(22) PCT Filed: May 18, 2020

(86) PCT No.: PCT/JP2020/019687
§ 371 (c)(1),
(2) Date: Aug. 31, 2022

(87) PCT Pub. No.: WO2021/192326
PCT Pub. Date: Sep. 3, 2021

(65) Prior Publication Data
US 2023/0341625 A1 Oct. 26, 2023

(30) Foreign Application Priority Data
Mar. 24, 2020 (JP) ................................. 2020-052473

(51) Int. Cl.
*G02B 6/255* (2006.01)
(52) U.S. Cl.
CPC ......... *G02B 6/2555* (2013.01); *G02B 6/2551* (2013.01); *G02B 6/2553* (2013.01)
(58) Field of Classification Search
CPC ... G02B 6/2551; G02B 6/2553; G02B 6/2555
See application file for complete search history.

(56) References Cited

U.S. PATENT DOCUMENTS

| | | | | |
|---|---|---|---|---|
| 6,976,796 B2 * | 12/2005 | Koike | ................ | G02B 6/2555 385/136 |
| 2008/0181563 A1 * | 7/2008 | Akiyama | ............ | G02B 6/2555 385/96 |

(Continued)

FOREIGN PATENT DOCUMENTS

| | | |
|---|---|---|
| JP | S61-259206 A | 11/1986 |
| JP | 2008242275 A | 10/2008 |

(Continued)

OTHER PUBLICATIONS

International Search Report issued in corresponding International Application No. PCT/JP2020/019687 dated Jul. 14, 2020 (7 pages).

*Primary Examiner* — Omar R Rojas
(74) *Attorney, Agent, or Firm* — Osha Bergman Watanabe & Burton LLP

(57) ABSTRACT

A jig for a fusion splicer mountable on a heater of the fusion splicer includes: a plate part configured to face a heating part of the heater; a first retainer, configured to face a first clamp of the fusion splicer that is disposed outside of the heating part along a longitudinal direction of an object to be heated, and further configured to retain a first member extending from a first end of the object along the longitudinal direction; and a second retainer, configured to face a second clamp disposed on a side of the heating part opposite to the first clamp along the longitudinal direction, and further configured to retain a second member extending from a second end of the object along the longitudinal direction.

20 Claims, 20 Drawing Sheets

(56) References Cited

U.S. PATENT DOCUMENTS

| | | |
|---|---|---|
| 2015/0030294 A1 | 1/2015 | Liu |
| 2016/0131840 A1 | 5/2016 | Kawanishi |
| 2016/0202416 A1 | 7/2016 | Kawanishi |
| 2019/0196105 A1 | 6/2019 | Meo et al. |

FOREIGN PATENT DOCUMENTS

| | | | |
|---|---|---|---|
| JP | 2009198928 A | | 9/2009 |
| JP | 2015508188 A | | 3/2015 |
| JP | 2017142469 A | | 8/2017 |
| JP | 2017207655 A | | 11/2017 |
| KR | 20000031351 A | * | 6/2000 |
| WO | 2014157255 A1 | | 10/2014 |

* cited by examiner

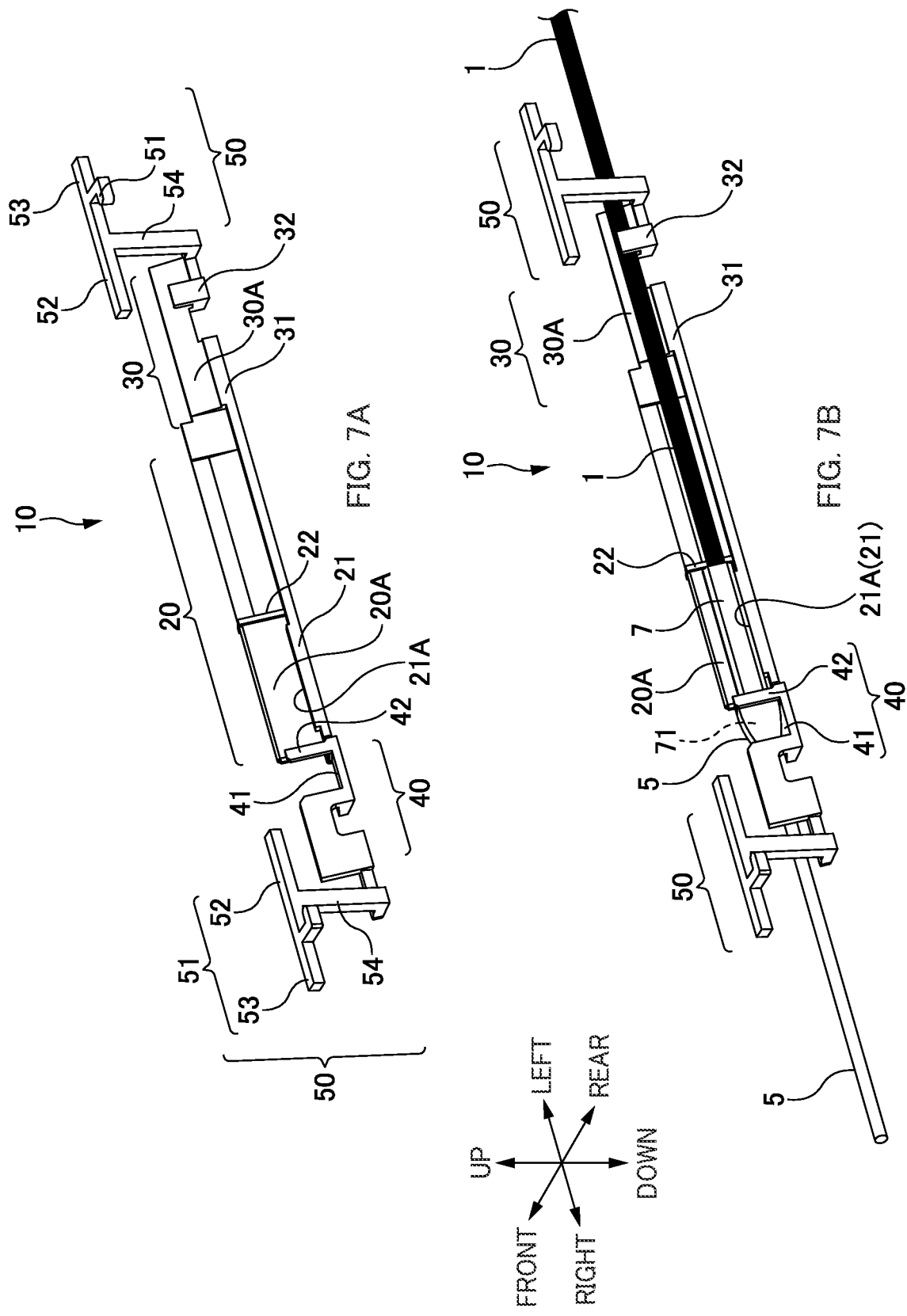

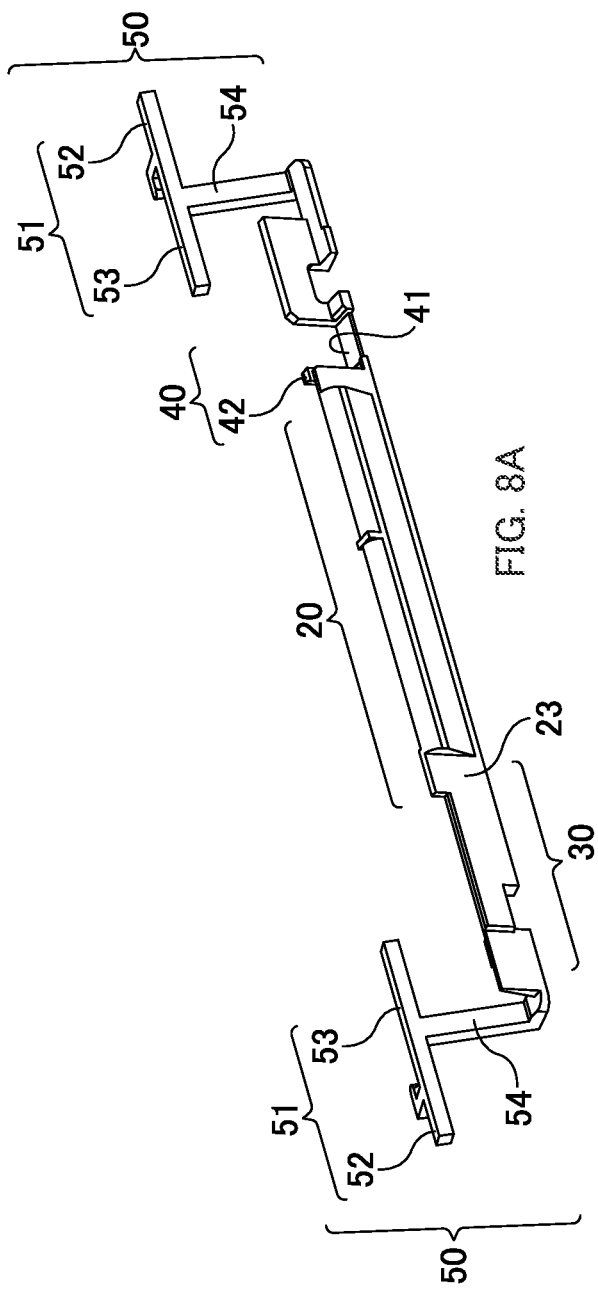
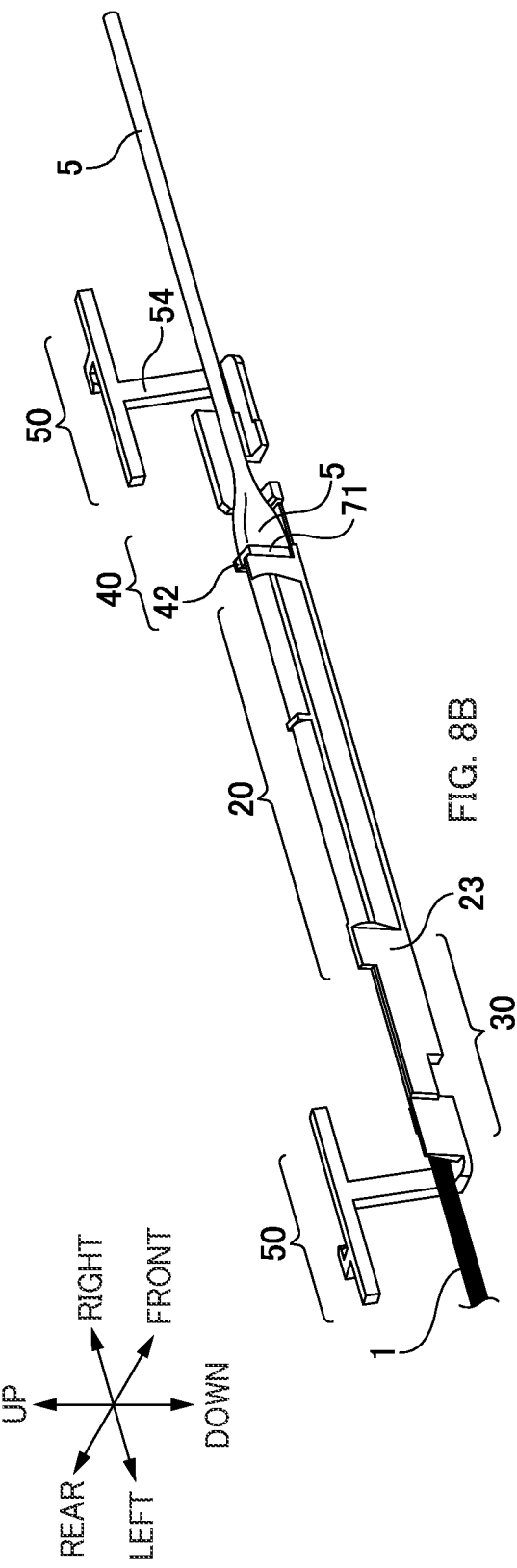

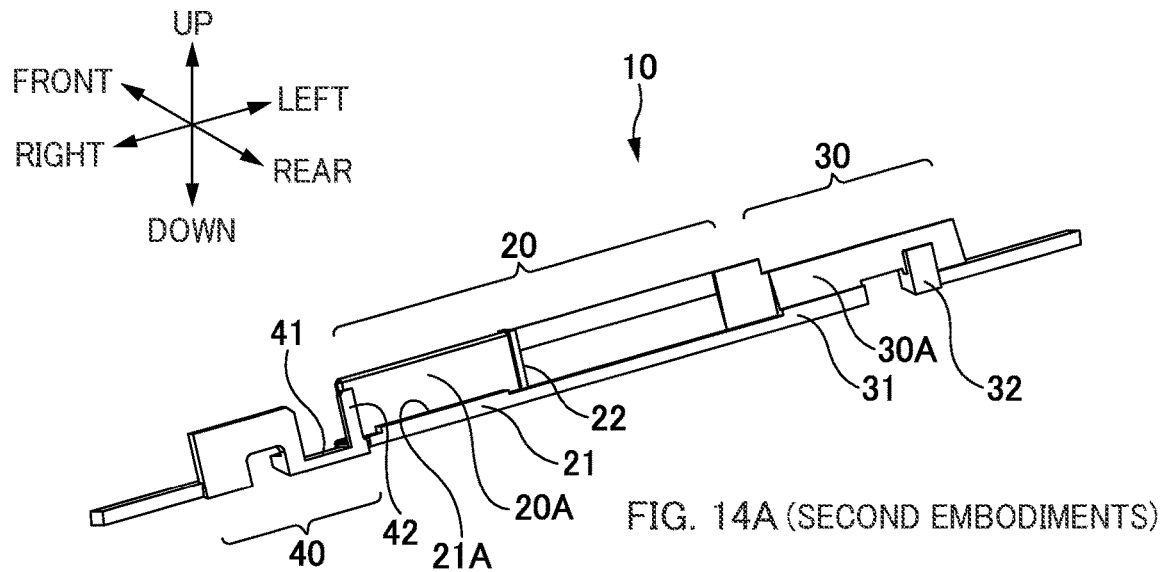
FIG. 14A (SECOND EMBODIMENTS)
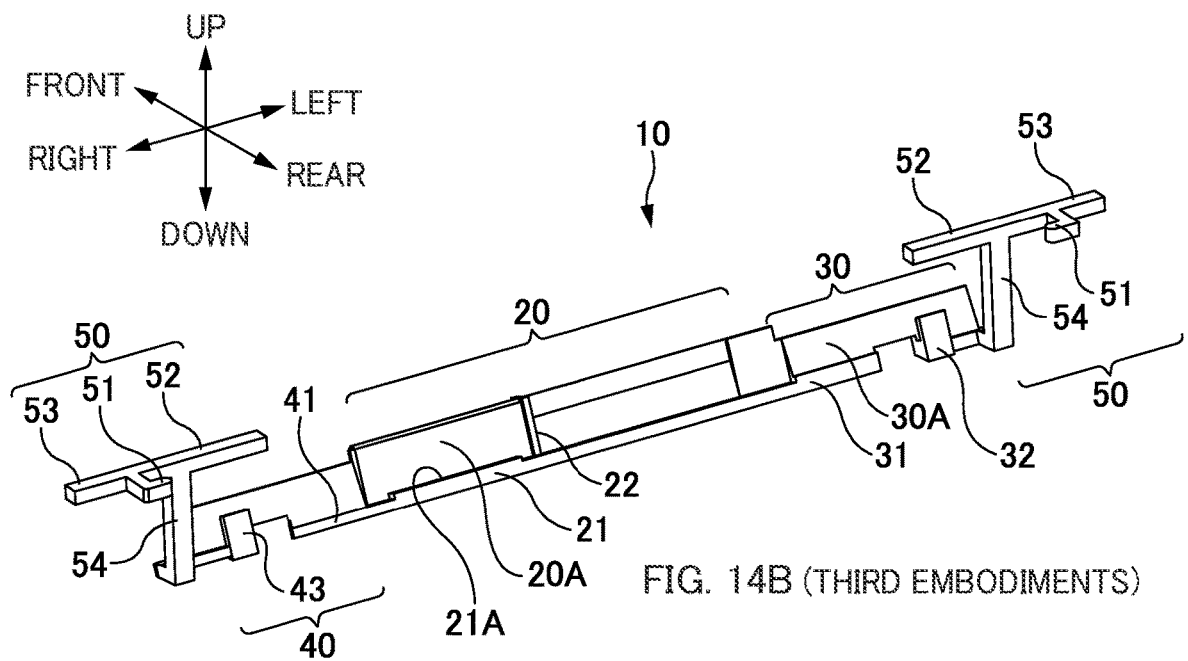
FIG. 14B (THIRD EMBODIMENTS)

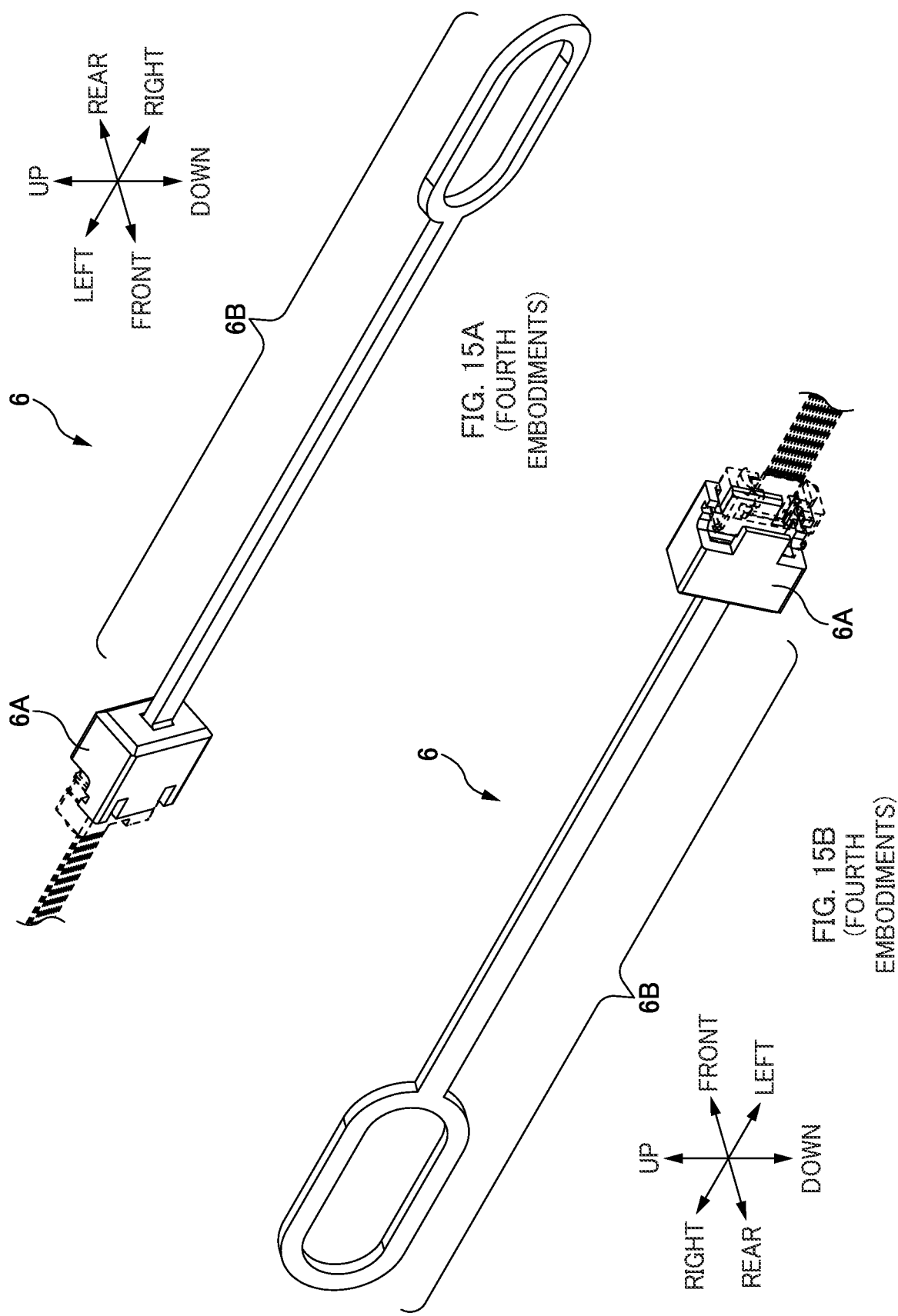

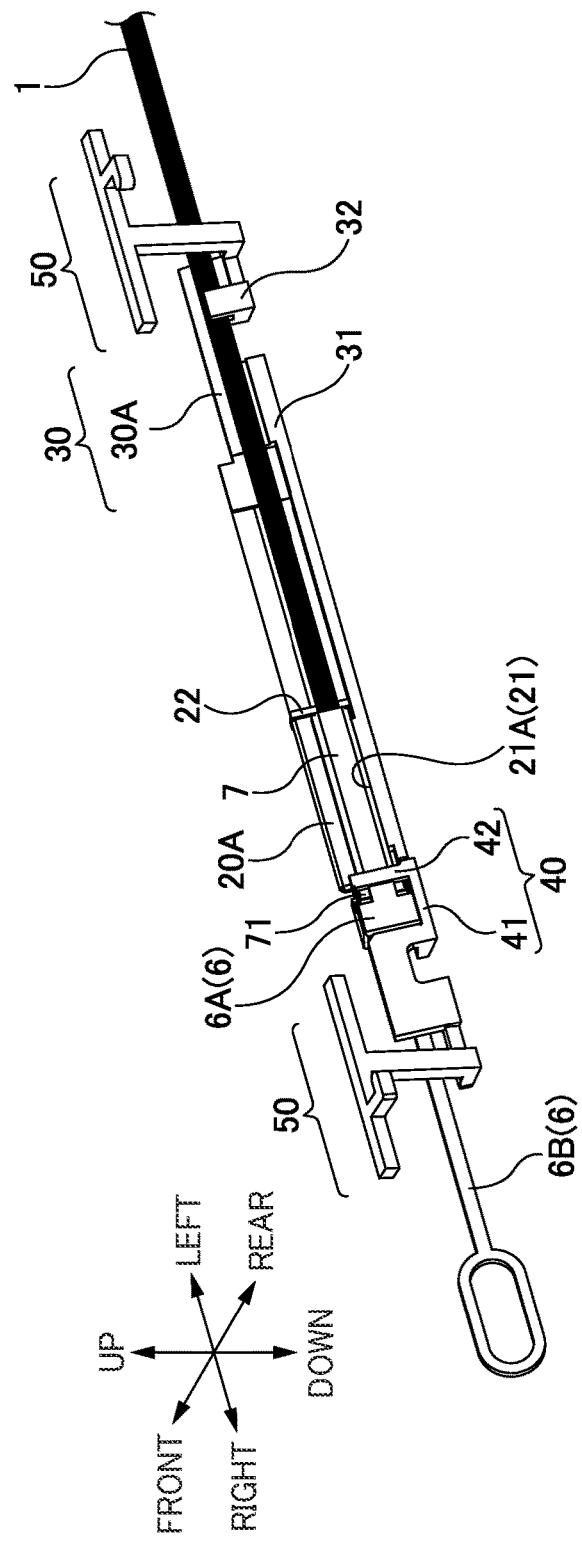
FIG. 16A (FOURTH EMBODIMENTS)
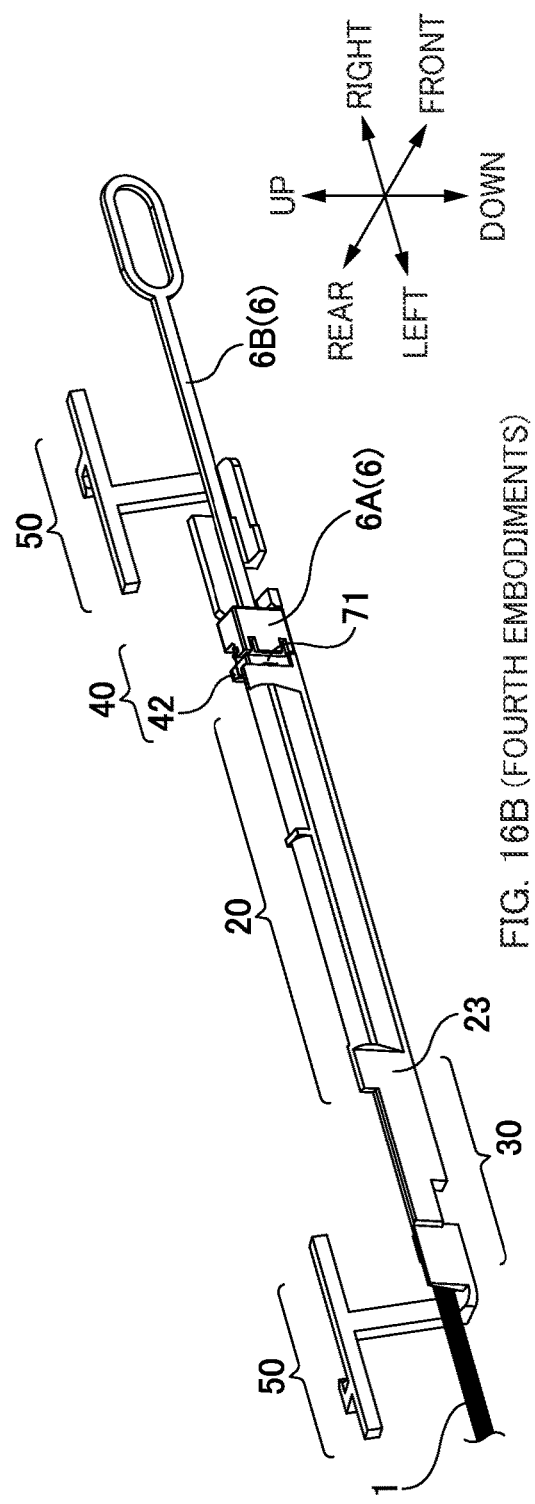
FIG. 16B (FOURTH EMBODIMENTS)

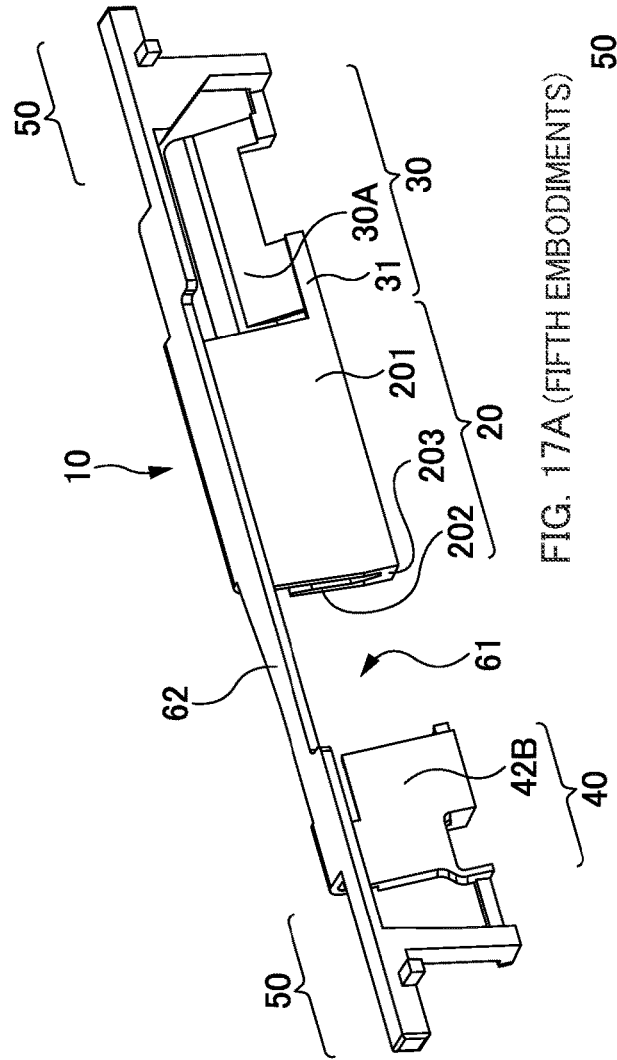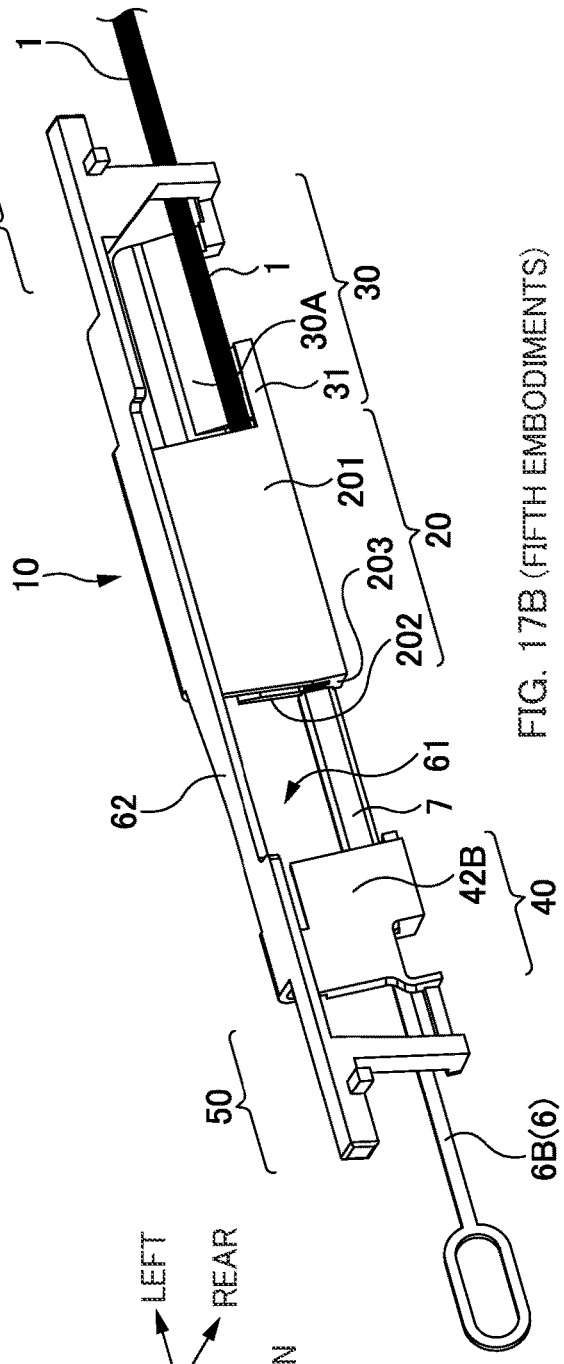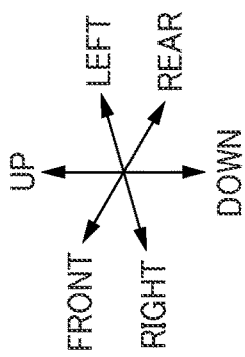

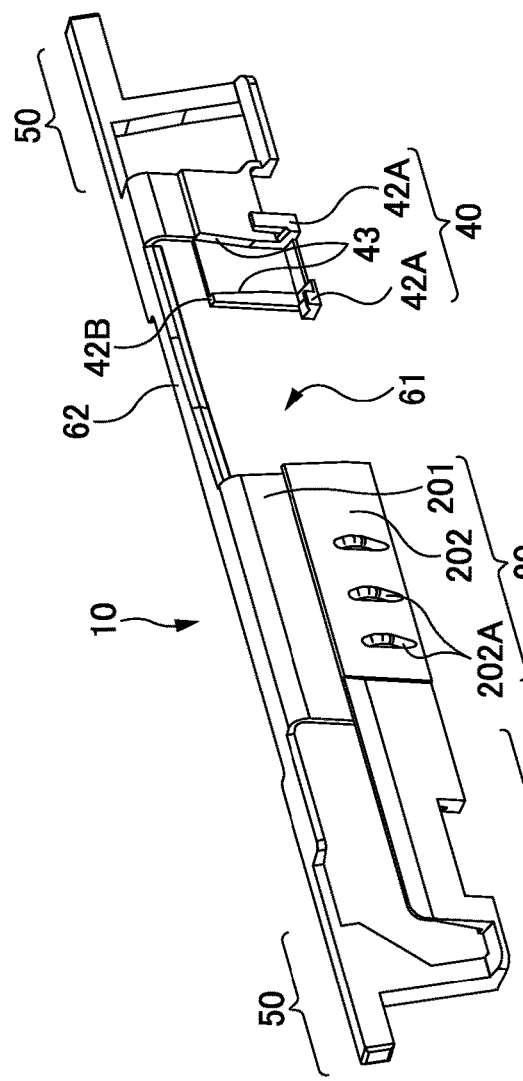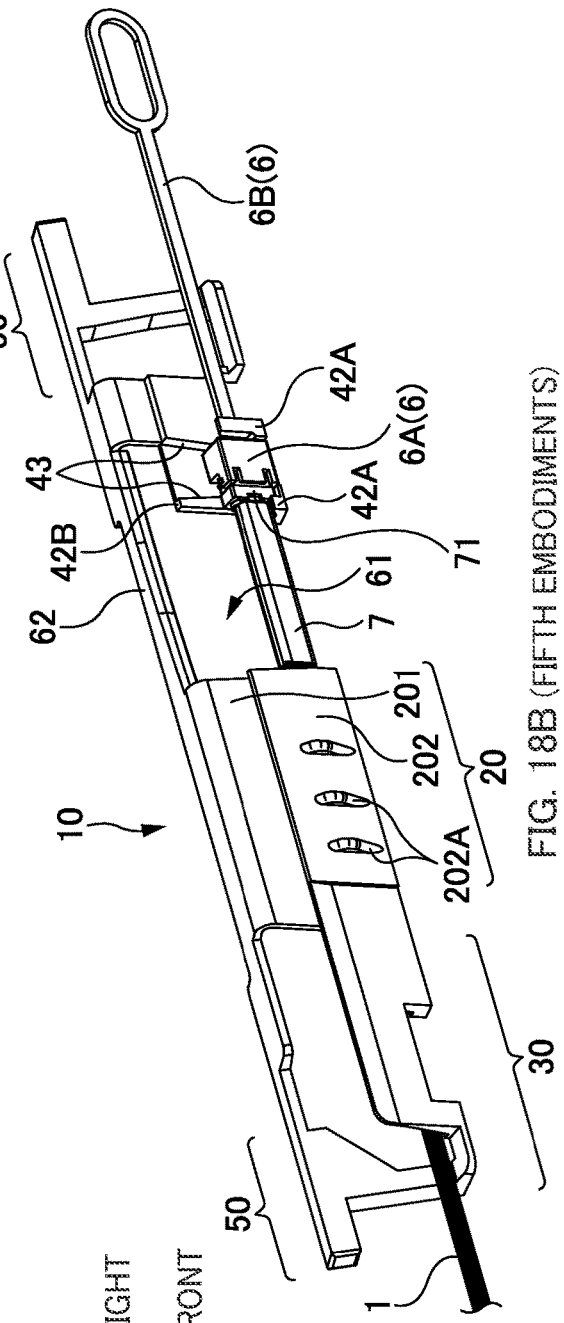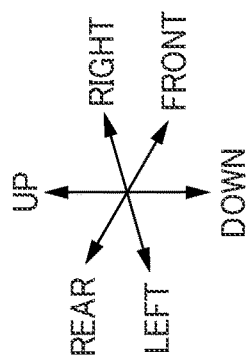

JIG FOR FUSION SPLICER AND HEATING METHOD

TECHNICAL FIELD

The present disclosure relates to a jig for a fusion splicer and a heating method.

BACKGROUND

A fusion splicer (a multi-fiber fusion splicer) is known that is capable of simultaneously splicing plural optical fibers. For example, FIG. 52 of PTL 1 illustrates mass fusion splicing of plural optical fibers.

PATENT LITERATURE

[PTL 1] Japanese Unexamined Patent Application Publication (Translation of PCT Application) No. JP 2015-508188

After the mass fusion splicing of plural optical fibers, as a post-process following the fusion splicing, a heat shrink sleeve is put over the splice point of the resultant plural optical fibers arrayed in a tape-like manner and is heated in a heater of the fusion splicer. In this process, if the clamping direction of the heating part of the heater (the direction that the heating part sandwiches the heat shrink sleeve) is different from the clamping direction of the clamp part of the heater (the direction that the clamp part sandwiches an object to be clamped), the plural optical fibers aligned in a tape-like manner are subject to torsion.

SUMMARY

One or more embodiments of the present invention prevent optical fibers from twisting during heating.

One or more embodiments of the invention provide a jig for a fusion splicer mountable on a heater of a fusion splicer, the jig for the fusion splicer comprising: a plate part configured to face a heating part of the heater; a first retaining part configured to face a first clamp part of the fusion splicer that is located to an outer side of the heating part along a longitudinal direction and retain a member extending from an end of an object to be heated along the longitudinal direction; and a second retaining part configured to face a second clamp part located on an opposite side of the heating part to the first clamp part along the longitudinal direction and retain a member extending from another end of the object to be heated along the longitudinal direction.

One or more embodiments of the invention provide a heating method comprising: preparing a jig for a fusion splicer including a plate part, a first retaining part configured to retain a member extending from an end of an object to be heated along a longitudinal direction of the object to be heated, and a second retaining part configured to retain a member extending from another end of the object to be heated along the longitudinal direction; preparing the fusion splicer including a heater including a heating part configured to heat the object to be heated, a first clamp part located to an outer side of the heating part along the longitudinal direction of the object to be heated, and a second clamp part located on an opposite side of the heating part to the first clamp part along the longitudinal direction; mounting the jig for the fusion splicer on the heater with the plate part facing the heating part, the first retaining part facing the first clamp part, and the second retaining part facing the second clamp part; and heating the object to be heated with the heating part while causing the plate part to support the object to be heated, the object having an elliptical cross-section, causing the first retaining part to retain a member extending from an end of the object to be heated along the longitudinal direction, and causing the second retaining part to retain a member extending from the other end of the object to be heated along the longitudinal direction.

The other characteristics of the present invention are made clear by the following description of the specification and drawings.

Advantageous Effects of Invention

According to the present invention, it is possible to prevent optical fibers from twisting during heating.

BRIEF DESCRIPTION OF THE DRAWINGS

FIG. 7A is a perspective view of the jig 10 of the embodiments, and FIG. 7B is an explanatory diagram of a situation where the heat shrink sleeve 7 is set in the jig 10 illustrated in FIG. 7A.

FIG. 8A is another perspective view of the jig 10 of the embodiments, and FIG. 8B is another explanatory diagram of a situation where the heat shrink sleeve 7 is set in the jig 10 illustrated in FIG. 8A.

FIG. 14A is an explanatory diagram of a jig of one or more embodiments, and FIG. 14B is an explanatory diagram of a jig 10 of one or more embodiments.

FIGS. 15A and 15B are explanatory diagrams of a jig 6 for a ferrule.

FIGS. 16A and 16B are explanatory diagrams of a situation where the heat shrink sleeve 7 is set in the jig 10 using the jig 6 for the ferrule.

FIG. 17A is a perspective view of a jig 10 of one or more embodiments, and FIG. 17B is an explanatory diagram of a situation where the heat shrink sleeve 7 is set in the jig 10 illustrated in FIG. 17A.

FIG. 18A is another perspective view of the jig 10 of the embodiments, and FIG. 18B is another explanatory diagram of a situation where the heat shrink sleeve 7 is set in the jig 10 illustrated in FIG. 18A.

DETAILED DESCRIPTION

Figure 1A:
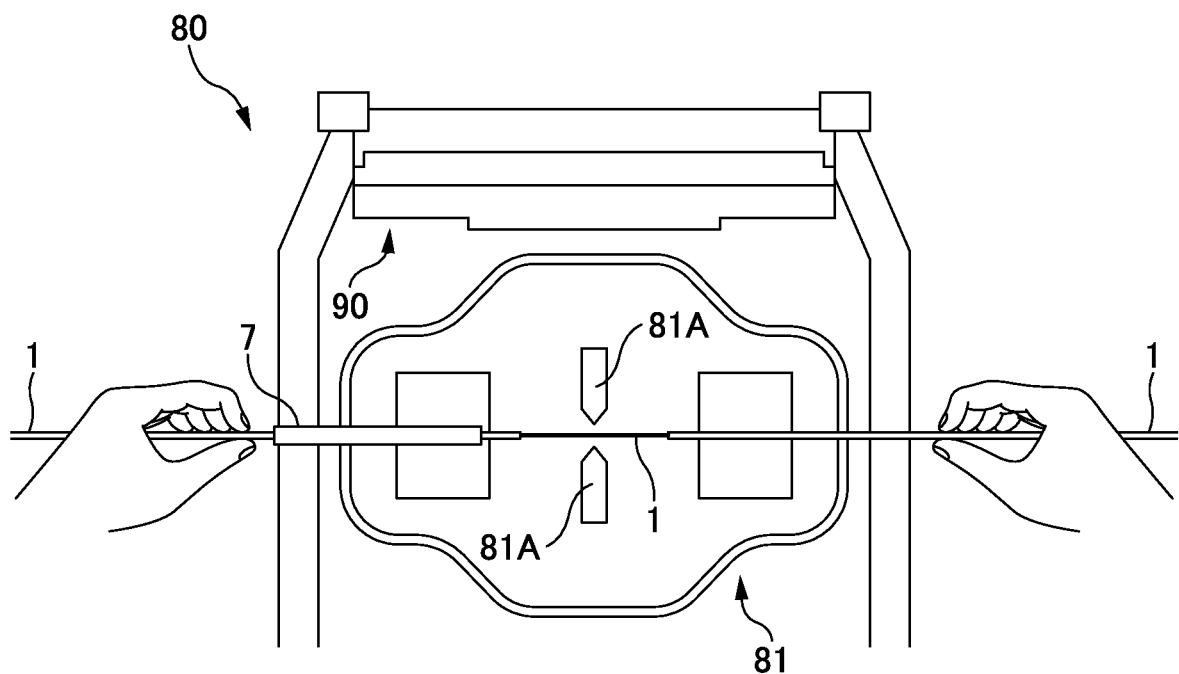
FIGS. 1A and 1B are explanatory diagrams of how to use a fusion splicer 80.

The later description of the specification and drawings makes clear at least the following matters.

A jig for a fusion splicer mountable on a heater of a fusion splicer, the jig for the fusion splicer comprising: a plate part configured to face a heating part of the heater; a first retaining part configured to face a first clamp part of the fusion splicer that is located to an outer side of the heating part along a longitudinal direction and retain a member extending from an end of an object to be heated along the longitudinal direction; and a second retaining part configured to face a second clamp part located on an opposite side of the heating part to the first clamp part along the longitudinal direction and retain a member extending from another end of the object to be heated along the longitudinal direction. According to the thus-configured jig for a fusion splicer, it is possible to prevent optical fibers from twisting during heating.

At least one of the first retaining part and the second retaining part may be configured to retain plural optical fibers aligned in a tape-like manner. It is therefore possible to retain plural optical fibers extending from the object to be heated.

At least one of the first retaining part and the second retaining part may be configured to retain a ferrule retaining plural optical fibers. It is therefore possible to retain a ferrule with optical fibers extending from the object to be heated.

It may further comprise a positioning part configured to set a position of the ferrule. It is therefore possible to retain the ferrule at a predetermined position.

It may further comprise a guide part that guides the ferrule to the position set by the positioning part. This facilitates the operation of setting the object to be heated in the heater while locating the ferrule at a predetermined position.

The positioning part may set the position of the ferrule by setting a position of a jig for the ferrule configured to retain the ferrule. The position of the ferrule may be indirectly set in such a manner.

It may further comprise an arm part configured to keep an orientation of the plate part, the first retaining part and the second retaining part with respect to the heater. It is therefore possible to locate the plate part, the first retaining part, and the second retaining part with a predetermined orientation with respect to the heater.

The arm part may include an engagement part configured to be engaged with the heater. It is therefore possible to keep the orientation of the plate part, the first retaining part, and the second retaining part with respect to the heater.

The engagement part may be engaged with a protrusion part that protrudes from a housing of the fusion splicer. It is therefore possible to hang the jig for the fusion splicer on the fusion splicer.

The arm part may be configured to be an elastic deformation and the arm part may be configured to release engagement between the engagement part and the protrusion part by the elastic deformation. This facilitates the operation of engaging and disengaging the engagement part.

The plate part may be configured to support the object to be heated along the longitudinal direction. It is therefore possible to heat the object to be heated while supporting the same.

The plate part may include a section of a higher thermal conductivity than thermal conductivity of the first retaining part and the second retaining part. The plate part may include a metallic plate. This facilitates heating the object to be heated.

The plate part may include a support surface applied with a surface treatment to prevent the object to be heated from adhering to the support surface. In this case, the support surface may include a rough surface. The support surface may be provided with a coating layer thereon. This prevents the object to be heated from adhering to the plate part.

The jig for the fusion splicer may be mountable in an insertion opening of the heater from a predetermined direction, and the plate part may be configured to allow insertion of the object to be heated from the predetermined direction.

The plate part may include a support surface configured to face the heating part and support the object to be heated, and a bottom part that is located at a bottom of the support surface and is configured to protrude from the support surface toward the heating part. This facilitates supporting the object to be heated on the support surface.

The bottom part may include a protruding part supporting the bottom of the object to be heated. This reduces heating of a member extending from the object to be heated.

The plate part may include a restriction part restricting the longitudinal position of the object to be heated. This facilitates locating the object to be heated at a predetermined position.

It may further comprise an exposure part configured to expose the object to be heated to the heating part. This facilitates heating the object to be heated with the heating part.

It may further comprise a connecting part provided at a position where the exposure part is located along the longitudinal direction, wherein the connecting part is configured to connect the plate part and at least one of the first retaining part and the second retaining part. It is therefore possible to connect (integrate) the plate part and one of the retaining parts even when the exposure part is provided.

The plate part may include a first plate member configured to face a movable heating plate of the heating part and a second plate member configured to face a fixed heating plate of the heating part, and the plate part may be configured to retain a member extending from the object to be heated along the longitudinal direction between the first plate member and the second plate member. This reduces heating of a member extending from the object to be heated along the longitudinal direction.

The second plate member may include a protrusion on a surface configured to face the fixed heating plate of the heating part. This reduces the area of contact between the second plate member and the fixed heating plate, further reducing heating of the member extending from the object to be heated along the longitudinal direction.

A heating method comprising: preparing a jig for a fusion splicer including a plate part, a first retaining part configured to retain a member extending from an end of an object to be heated along a longitudinal direction of the object to be heated, and a second retaining part configured to retain a member extending from another end of the object to be heated along the longitudinal direction; preparing the fusion splicer including a heater including a heating part configured to heat the object to be heated, a first clamp part located to an outer side of the heating part along the longitudinal direction of the object to be heated, and a second clamp part located on an opposite side of the heating part to the first clamp part along the longitudinal direction; mounting the jig for the fusion splicer on the heater with the plate part facing the heating part, the first retaining part facing the first clamp part, and the second retaining part facing the second clamp part; and heating the object to be heated with the heating part while causing the plate part to support the object to be heated, the object having an elliptical cross-section, causing the first retaining part to retain a member extending from an end of the object to be heated along the longitudinal direction, and causing the second retaining part to retain a member extending from the other end of the object to be heated along the longitudinal direction. According to the thus-configured heating method, it is possible to prevent optical fibers from twisting during heating.

First Embodiments

The jig of the first embodiments is mounted on a heater of a fusion splicer for use. The heater of the fusion splicer is first described, and the jig of the first embodiments is then described.

Reference: Heater 90 of Fusion Splicer 80

Figure 1B:
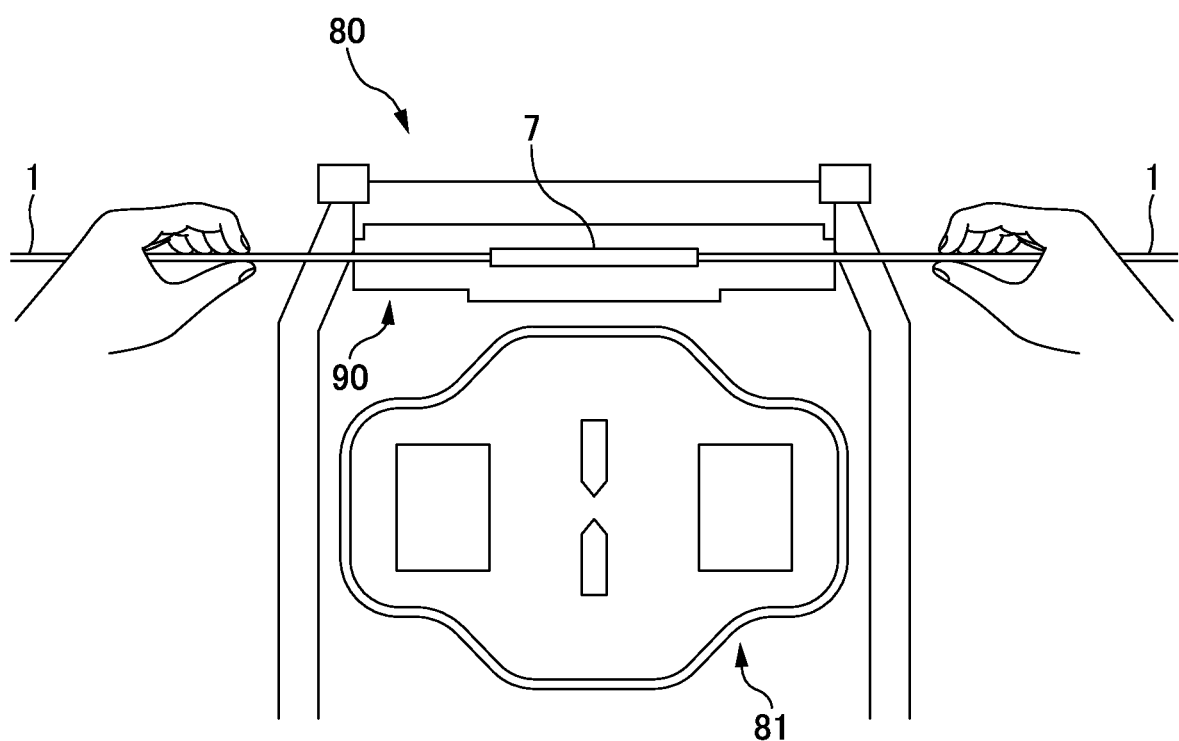

FIGS. 1A and 1B are explanatory diagrams of how to use a fusion splicer 80.

As illustrated in FIG. 1A, the fusion splicer 80 includes a fusion-splice device 81 and a heater 90. The fusion-splice device 81 is a device for fusion splicing of optical fibers 1. The fusion-splice device 81 includes a pair of electrodes 81A and produces an arc discharge with the pair of electrodes 81A for fusion splicing of the optical fibers 1. After the fusion splicing, as illustrated in FIG. 1A, an operator puts a heat shrink sleeve 7 over the fusion-splice point while applying tension to the fusion-splice point. The operator then, as illustrated in FIG. 1B, sets the heat shrink sleeve 7 put over the fusion-splice point, in the heater 90 and heats the heat shrink sleeve 7.

Figure 2:
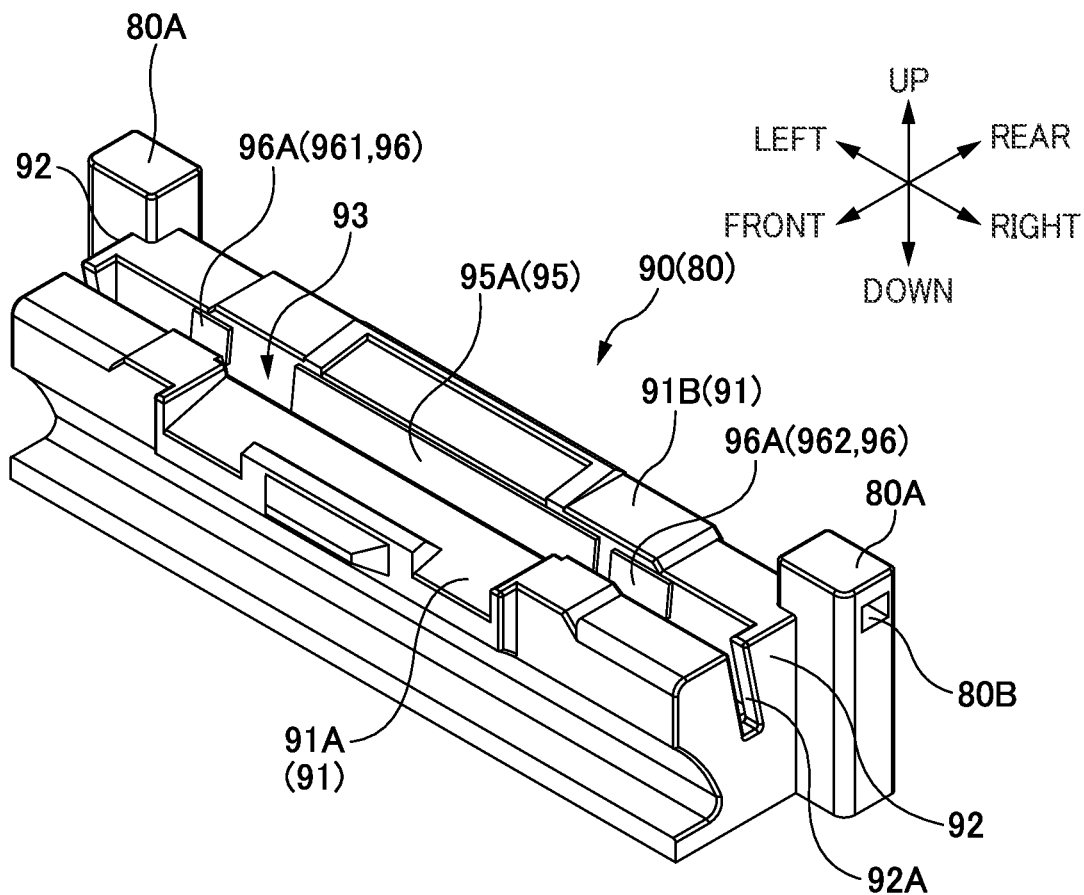
FIG. 2 is a perspective view of a heater 90 of the fusion splicer 80.

FIG. 2 is a perspective view of the heater 90 of the fusion splicer 80.

In the following description, directions are defined as illustrated in FIG. 2. The longitudinal direction of the optical fibers 1 and heat shrink sleeve 7 set in the heater 90 is referred to as a "right-left direction", and the right side of the right-left direction as seen from the operator is referred to as "right" while the opposite side is referred to as "left". The "right-left direction" is also referred to as "longitudinal direction". The near side of the operator is referred to as "front" while the far side is referred to as "rear". The direction perpendicular to the right-left direction and front-rear direction is referred to as an "up-down direction". The vertically upper side is referred to as "up" while the opposite side is referred to as "down".

The heater 90 is a device heating an object to be heated. In the first embodiments, the heater 90 heats the heat shrink sleeve 7 as the object to be heated. The heat shrink sleeve 7 is a member protecting the fusion-splice point. The heat shrink sleeve 7 is also referred to as a heat shrink tube, a reinforcement sleeve, a reinforcement tube, or the like.

The heater 90 includes a pair of wall parts 91 (a front wall part 91A, a rear wall part 91B). The pair of wall parts 91 (the front and rear wall parts 91A and 91B) are located apart from each other along the front-rear direction. Between the paired wall parts 91, an accommodation part 93 is formed. The accommodation part 93 is a section configured to accommodate the heat shrink sleeve 7 (and members such as optical fibers 1 extending from the object to be heated (an object to be clamped)). The heat shrink sleeve 7 is set between the paired wall parts 91 (in the accommodation part 93) and is heated. The upper side between the paired wall parts 91 is open and forms an insertion opening so that the heat shrink sleeve 7 can be set from above between the paired wall parts 91. A later-described jig 10 is mounted from above between the paired wall parts 91 (in the accommodation part 93).

The heater 90 includes right and left side wall parts 92. In the first embodiments, the accommodation part 93 is composed of a space surrounded by the pair of wall parts 91 (the front and rear wall parts 91A and 91B) and the right and left side wall parts 92. In the first embodiments, in addition, the insertion opening is an opening formed by the pair of wall parts 91 (the front and rear wall parts 91A and 91B) and the right and left side wall parts 92. Each side wall part 92 includes a slit 92A that is open at the top. With the provision of the slit 92A in each side wall part 92, the operator can set the heat shrink sleeve 7 in the heater 90 while applying tension to the fusion-splice point.

Figure 3A:
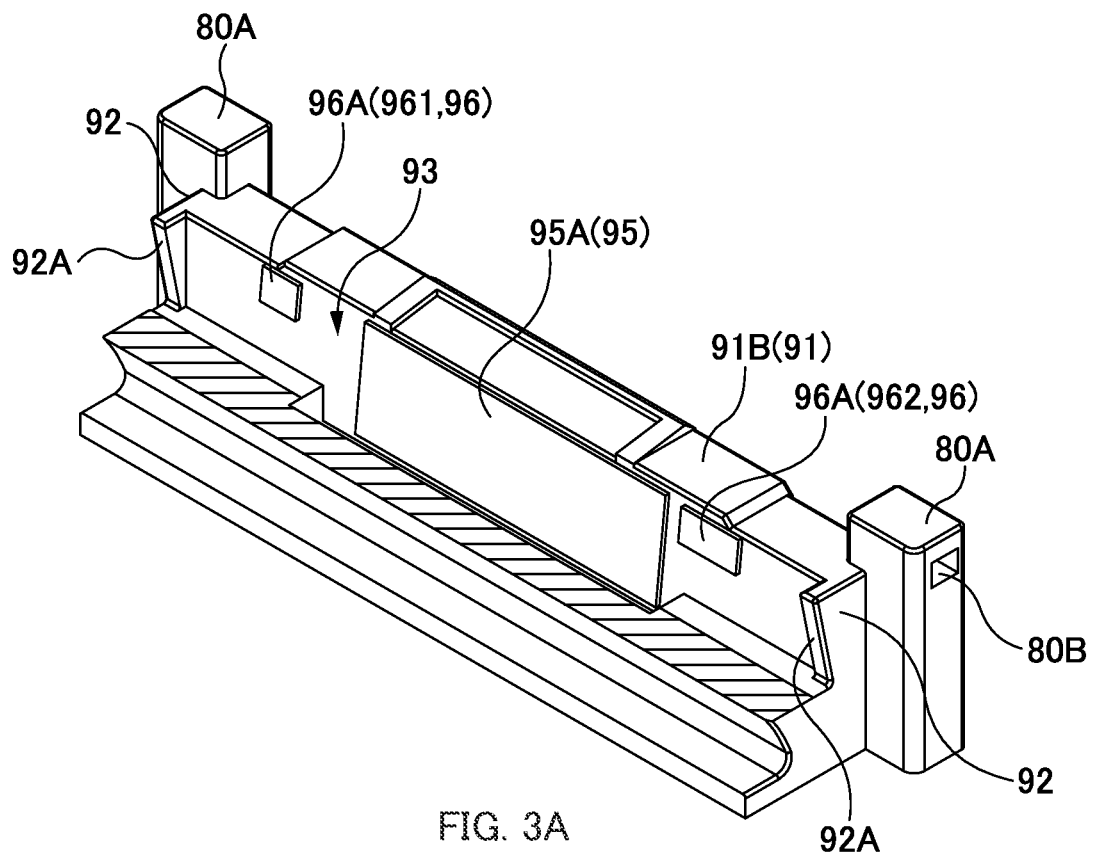
FIGS. 3A and 3B are explanatory diagrams of a heating part 95 and a pair of clamp parts 96.
Figure 3B:
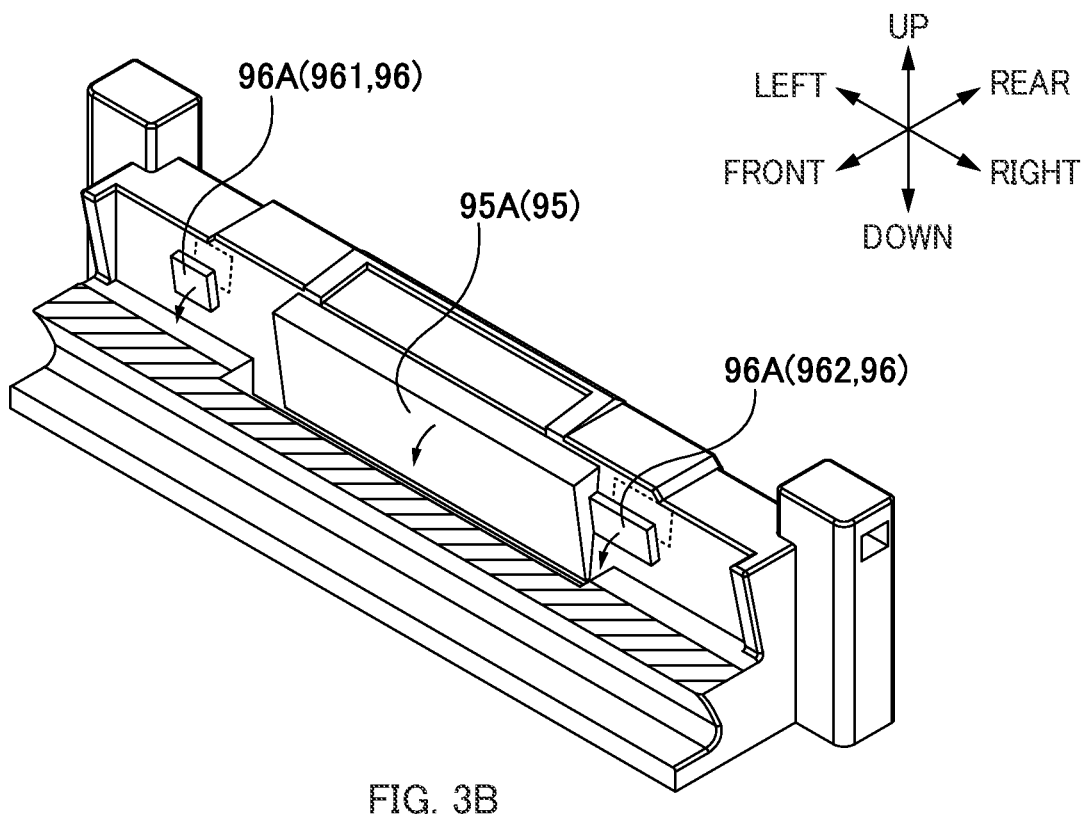

The heater 90 includes a heating part 95 and a pair of clamp parts (i.e., "clamps") 96 (a first clamp part (i.e., "first clamp") 961 and a second clamp part (i.e., "second clamp) 962). FIGS. 3A and 3B are explanatory diagrams of the heating part 95 and the pair of clamp parts 96. In FIGS. 3A and 3B, the front wall part 91A (and members provided for the front wall part 91A) is not illustrated, and the heating part 95 and the pair of clamp parts 96 provided for the rear wall part 91B are illustrated. FIG. 3A is an explanatory view of the heating part 95 and the pair of clamp parts 96 that are at a retracted position. FIG. 3B is an explanatory view of the heating part 95 and the pair of clamp parts 96 that are at an approaching position.

The heating part 95 is a member configured to heat the object to be heated. The heating part 95 includes a pair of heater plates 95A. One of the heater plates 95A is provided for the rear wall part 91B, and the other heater plate 95A (not illustrated) is provided for the front wall part 91A. The paired heater plates 95A are located so as to face each other along the front-rear direction and are configured to come close to or separate from each other. When the heat shrink sleeve 7 (the object to be heated) is set in the heater 90, the heat shrink sleeve 7 is located between the paired heater plates 95A. When the pair of heater plates 95A come close to each other, the heat shrink sleeve 7 is sandwiched and heated therebetween. At least one of the paired heater plates 95A is movable. In the first embodiments, the heater plate 95A of the rear wall part 91B is movable while the heater plate 95A (not illustrated) of the front wall part 91A is fixed. The paired heater plates 95A may be both configured to be movable.

The clamp parts 96 are members configured to grip members extending from the object to be heated. In other words, the clamp parts 96 are members configured to grip the objects to be clamped, longitudinally to outer sides of the object to be heated. The paired clamp parts 96 are located longitudinally to outer sides of the heating part 95. In the following description, the clamp part 96 to the left of the heating part 95 is sometimes referred to as a "first clamp part 961" while the clamp part 96 to the right of the heating part 95 is sometimes referred to as a "second clamp part 962". The first clamp part 961 and the second clamp part 962 have substantially the same configuration. Each clamp part 96 includes a pair of clampers 96A (clamp plates). The paired clampers 96A are located so as to face each other along the front-rear direction and are configured to come close to or separate from each other. When the heat shrink sleeve 7 is set in the heater 90, a member (the optical fibers 1, for example) extending from the heat shrink sleeve 7 is located between the paired clampers 96A. The member located between the paired clampers 96A is an object to be gripped by the clamp part 96 (the object to be clamped). When the paired clampers 96A come close to each other, a member (the optical fibers 1, for example) extending from the heat shrink sleeve 7 is sandwiched and gripped by the paired clampers 96A. The paired clamp parts 96 individually grip members (the optical fibers 1, for example) extending from the heat shrink sleeve 7, so that the heating part 95 can stably heat the heat shrink sleeve 7. In the first embodiments, among each pair of clampers 96A, the clamper 96A in the rear wall part 91B is movable, and the clamper 96A (not illustrated) in the front wall part 91A is fixed. Both the paired clampers 96A may be configured to be movable. Alternatively, each clamp part 96 may be configured to include only one movable clamper 96A and come close to or separate from the opposite wall part 91 (the front or rear wall part 91A or 91B). The clamp part 96 thereby grips a member (the optical fibers, for example) between the clamper 96A and the opposite wall part 91.

Figure 4:
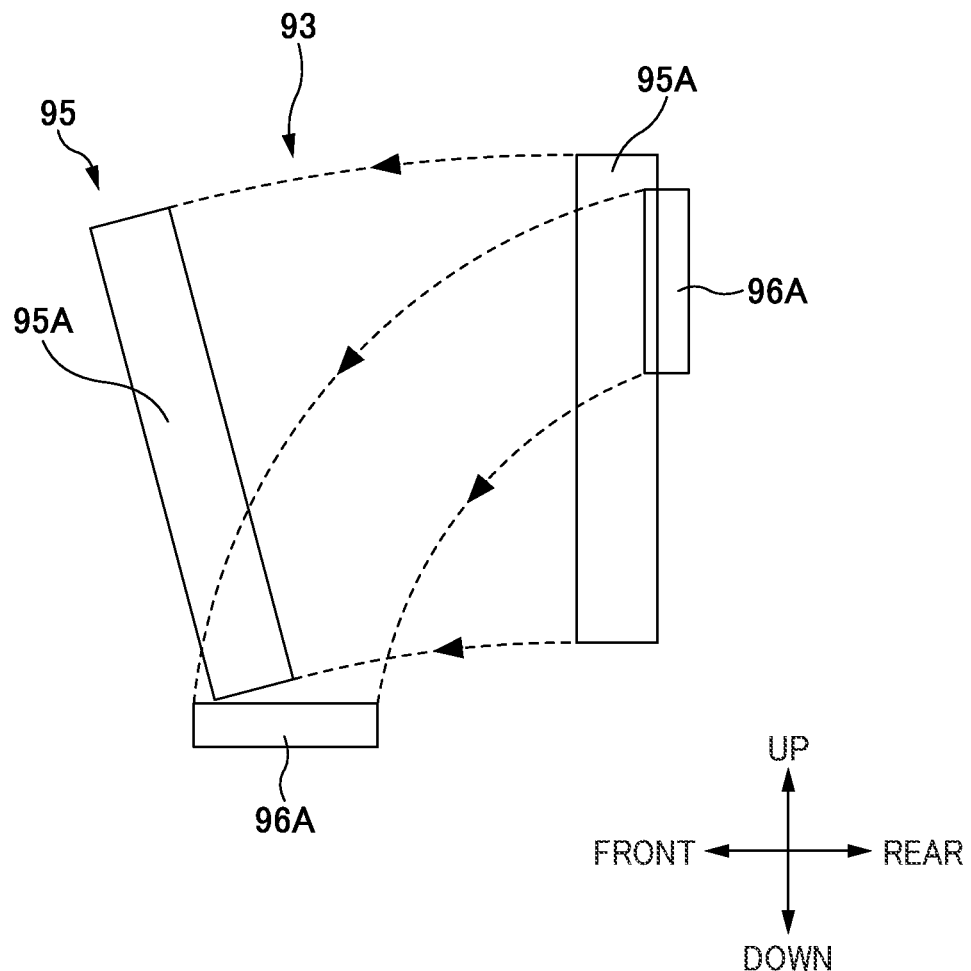
FIG. 4 is an explanatory diagram of trajectories of movable portions of the heating part 95 and clamp parts 96.

FIG. 4 is an explanatory diagram of trajectories of the movable portions of the heating part 95 and the clamp part 96. As illustrated in FIG. 4, the trajectories of the movable portions of the heating plate 95A and clamper 96A are different from each other. In the first embodiments, therefore, the holding direction of the heating part 95 (the direction that the heating part 95 sandwiches the heat shrink sleeve 7) is different from the holding direction of the clamp part 96 (the direction that the clamp part 96 sandwiches the object to be clamped).

Figure 5A:
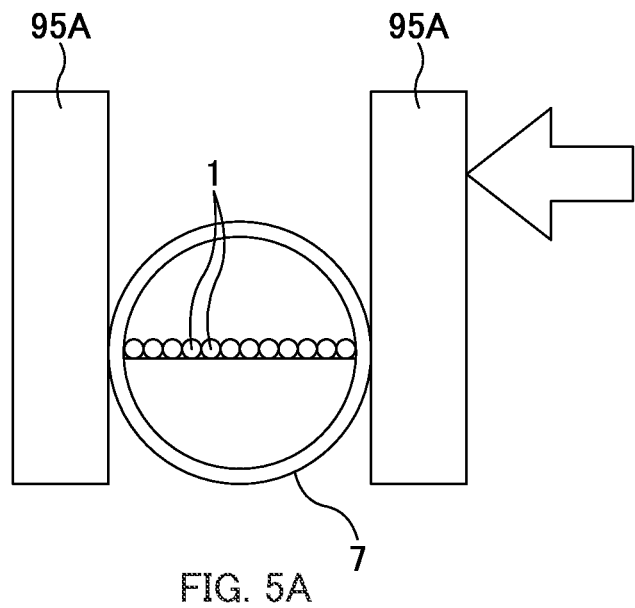
FIGS. 5A and 5B are explanatory diagrams of paired heater plates 95A sandwiching and holding a heat shrink sleeve 7.
Figure 5B:
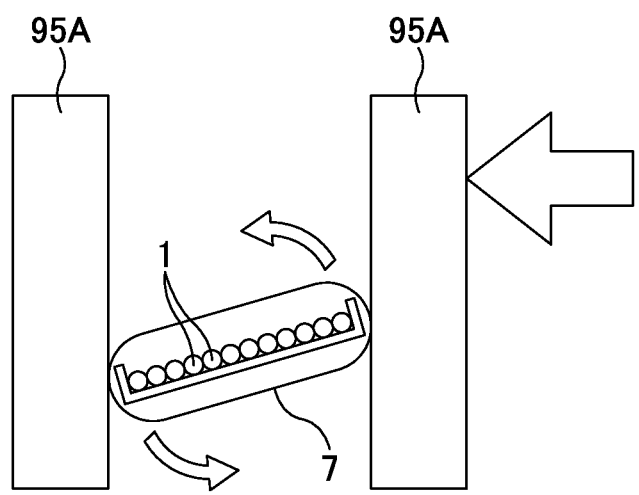

FIGS. 5A and 5B are explanatory diagrams of the paired heater plates 95A sandwiching and holding the heat shrink sleeve 7.

As illustrated in FIG. 5A, when the heat shrink sleeve 7 has a circular cross-section and is sandwiched between the paired heater plates 95A, the heat shrink sleeve 7 does not rotationally move. When the paired heater plates 95A sandwich and hold the heat shrink sleeve 7 having a circular cross-section while the paired clampers 96A sandwich and hold the optical fibers 1 extending from the heat shrink sleeve 7, therefore, the portion of the plural optical fibers 1 aligned in a tape-like manner within the heat shrink sleeve 7 does not twist relative to the portion of the plural optical fibers 1 located longitudinally outside of the heat shrink sleeve 7 (the portion of the plural optical fibers 1 sandwiched and held by the paired clampers 96A).

In contrast, as illustrated in FIG. 5B, when the heat shrink sleeve 7 has an elliptical cross-section and is sandwiched between the paired heater plates 95A, the heat shrink sleeve 7 rotationally moves such that the paired heater plates 95A can be closer to each other. This rotational movement changes the direction that the plural optical fibers 1 are aligned in a tape-like manner within the heat shrink sleeve 7, that is, rotates the tape face. Since the trajectories of the heater plate 95A and clamper 96A are different from each other as illustrated in FIG. 4, when the paired heater plates 95A sandwich and hold the heat shrink sleeve 7 while the paired clampers 96A sandwich and hold the optical fibers 1 extending from the heat shrink sleeve 7, the portion of the plural optical fibers 1 within the heat shrink sleeve 7 twists relative to the portion of the plural optical fibers 1 located longitudinally outside of the heat shrink sleeve 7 (the portion of the plural optical fibers 1 sandwiched and held by the paired clampers 96A). If the heat shrink sleeve 7 is heated in such a twisted state, the resulting plural optical fibers 1 aligned in a tape-like manner are fixed in the twisted state, which can increase the transmission loss of the optical fibers 1.

The first embodiments therefore use the jig 10 to prevent the optical fibers 1 from twisting. Hereinafter, the jig 10 of the first embodiments is described.

Jig 10

Figure 6A:
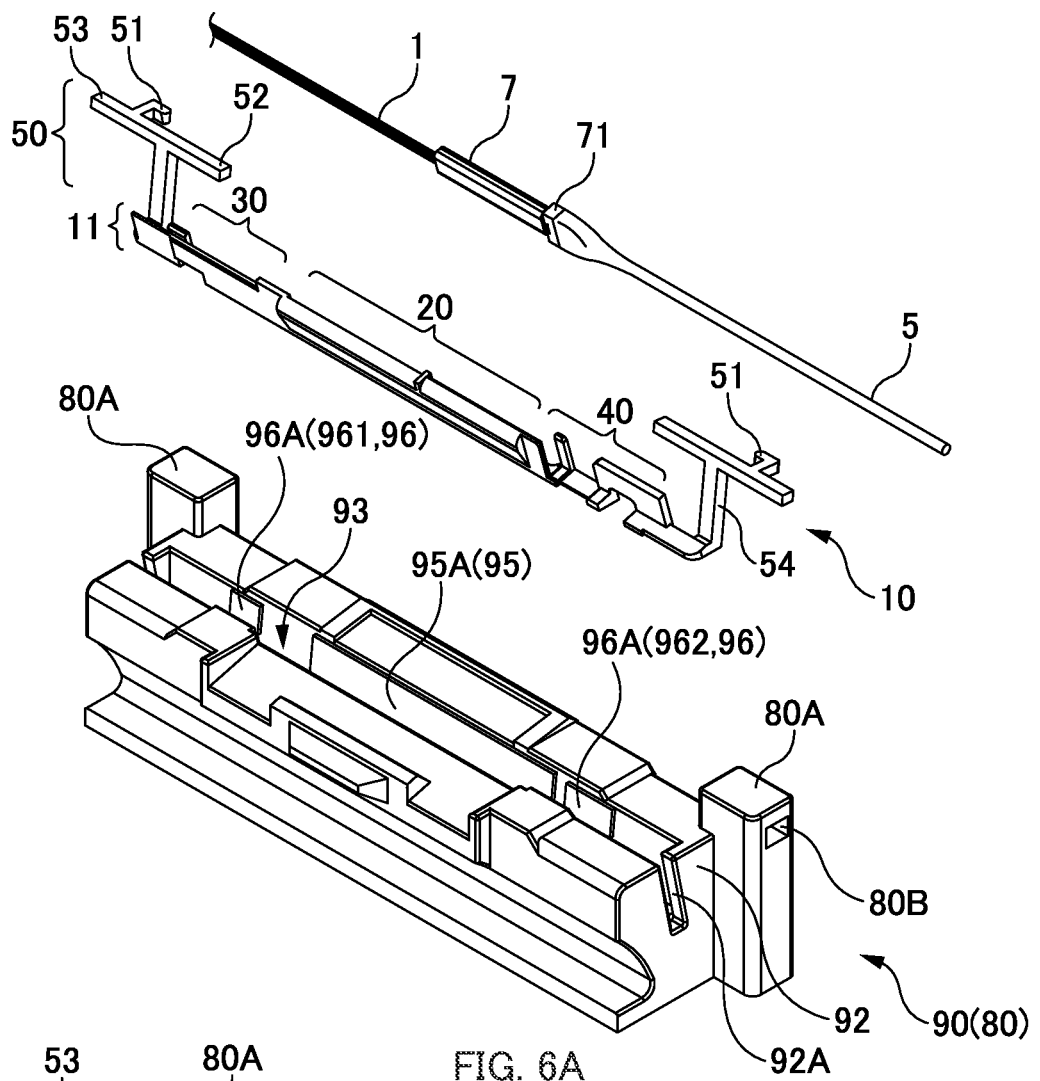
FIG. 6A is an explanatory diagram of a situation where a jig 10 of one or more embodiments and the heat shrink sleeve 7 are not yet set in the heater 90.
Figure 6B:
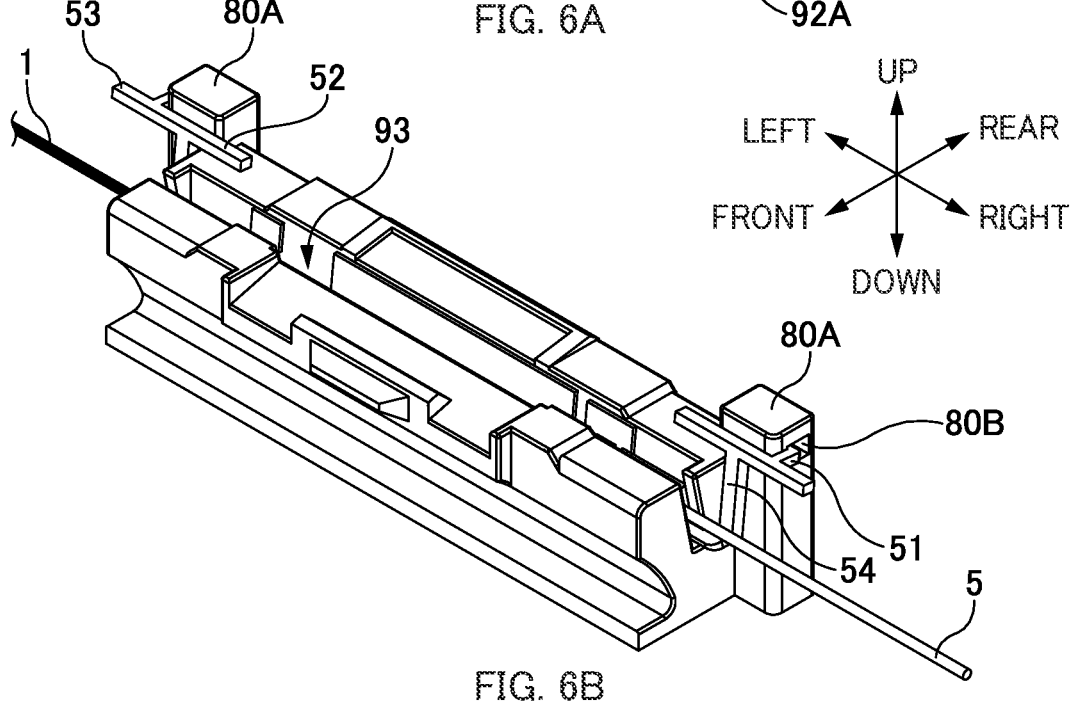
FIG. 6B is an explanatory diagram of a situation where the jig 10 of the embodiments and the heat shrink sleeve 7 are set in the heater 90.

FIG. 6A is an explanatory diagram of a situation where a jig 10 of the first embodiments and the heat shrink sleeve 7 are not yet set in the heater 90, and FIG. 6B is an explanatory diagram of a situation where the jig 10 of the first embodiments and the heat shrink sleeve 7 are set in the heater 90. FIG. 7A is a perspective view of the jig 10 of the first embodiments, and FIG. 7B is an explanatory diagram of a situation where the heat shrink sleeve 7 is set in the jig 10 illustrated in FIG. 7A. FIG. 8A is another perspective view of the jig 10 of the first embodiments, and FIG. 8B is another explanatory diagram of a situation where the heat shrink sleeve 7 is set in the jig 10 illustrated in FIG. 8A.

The jig 10 is a member that is mountable on the heater 90 of the fusion splicer 80 and is a member for setting the object to be heated in the heater 90 (a jig for a fusion splicer; an attachment). The jig 10 includes a body part 11 and arm parts 50.

The body part 11 is a section constituting the body of the jig 10. The body part 11 is a section that is configured to be mounted in an accommodation part 93 of the heater 90 and in which an object to be heated (the heat shrink sleeve 7 herein) is set. The body part 11 has an elongated shape along the longitudinal direction. When the jig 10 is set in the heater 90, the body part 11 is extended in the accommodation part 93 of the heater 90 along its longitudinal direction (see FIG. 6B). That is, when the jig 10 is set in the heater 90, the body part 11 is located between the paired wall parts 91 of the heater 90. Both ends of the body part 11 connect to the arm parts 50. When the jig 10 is set in the heater 90, the right and left ends of the body part 11 are inserted through the slits 92A in the side walls of the heater 90 (see FIG. 6B), and the arm parts 50 are located outside of the respective side walls.

The jig 10 (the body part 11) of the first embodiments includes a plate part 20, a first retaining part (i.e., "first retainer") 30, and a second retaining part (i.e., "second retainer") 40.

The plate part 20 is a plate-like member configured to face the heating part 95 of the heater 90. The plate part 20 of the first embodiments is a section configured to face the heating part 95 of the heater 90 and support the object to be heated along the longitudinal direction. As described later, the plate part 20 may not support the object to be heated. The plate part 20 is configured to support the heat shrink sleeve 7 having an elliptical cross-section as the object to be heated. The plate part 20 is an elongated plate-like section along the longitudinal direction. When the jig 10 is set in the heater 90, the plate part 20 is located between the paired heater plates 95A of the heating part 95. Specifically, when the jig 10 is set in the heater 90, one of the surfaces of the plate part 20 faces one of the paired heater plates 95A while the other surface of the plate part 20 faces the other heater plate 95A. The plate part 20 restricts the range of movement of the movable heater plate 95A of the heating part 95 as described later, which prevents the plural optical fibers 1 from twisting. The plate part 20 includes a support surface 20A and a bottom part 21.

The support surface 20A is a plate surface configured to support the heat shrink sleeve 7 as the object to be heated. In the first embodiments, the heat shrink sleeve 7 having an elliptical cross-section is the object to be heated and is supported on the support surface 20A so that the major axis of the elliptical cross-section is substantially parallel to the support surface 20A. In other words, the support surface 20A supports one of the flat faces of the flat heat shrink sleeve 7. The support surface 20A faces the movable heater plate 95A. The heat shrink sleeve 7 is sandwiched and held between the support surface 20A and the movable heater plate 95A to be heated. When the movable heater plate 95A moves and sandwiches the heat shrink sleeve 7 against the support surface 20A, the movable heater plate 95A is prevented from further moving due to resistive force from the support surface 20A. This prevents the optical fibers 1 from twisting (described later).

When the heat shrink sleeve 7 is heated, a hot-melt adhesive within the heat shrink sleeve 7 may flow out, and the heat shrink sleeve 7 may adhere to the support surface 20A with the hot-melt adhesive. Therefore, the support surface 20A may be applied with a surface-treatment for preventing such adherence. For example, the support surface 20A may be roughened. Examples of the surface treatment to roughen the surface include emboss processing. The support surface 20A may be provided with a coating layer thereon. Examples of the surface treatment to form a coating layer include Teflon (registered trademark) coating.

When the jig 10 is set in the heater 90, the plate part 20 comes into contact with the fixed heater plate 95A (the not-illustrated heater plate 95A fixed to the front wall part 91A in FIG. 2). That is, the opposite surface of the plate part 20 to the support surface 20A is a contact surface configured to come into contact with the fixed heater plate 95A. This facilitates heating the plate part 20 with heat from the fixed heater plate 95A and thereby facilitates transfer of heat from the fixed heater plate 95A to the heat shrink sleeve 7.

In the first embodiments, the body part 11 is integrally molded with resin, and the plate part 20 is made of the same material as the first retaining part 30 and the second retaining part 40. In order to facilitate transfer of heat from the heater plate 95A (the not-illustrated heater plate 95A fixed to the front wall part 91A in FIG. 2) to the heat shrink sleeve 7 through the plate part 20, the plate part 20 may include a section of a higher heat conductivity than heat conductivity of the first retaining part 30 and the second retaining part 40. For example, the plate part 20 may include a metallic plate, the metallic plate included in the plate part 20 facilitates transfer of heat from the heater plates 95A to the heat shrink sleeve 7 through the plate part 20. In the case of providing a metallic plate for the plate part 20, the metallic plate may be located in the surface opposite to the support surface 20A of the plate part 20 (the surface coming into contact with the heater plate 95A).

At an end part of the plate part 20, a thin wall part 23 is provided (see FIG. 8A). The thin wall part 23 is recessed from the surface of the plate part 20 that comes into contact with the fixed heater plate 95A. When the jig 10 is set in the heater 90, the thin wall part 23 of the plate part 20 does not come into contact with the fixed heater plate 95A. This reduces transfer of heat from the fixed heater plate 95A to the optical fibers 1 (a member extending from the object to be heated), thus reducing heating of the optical fibers 1.

The bottom part 21 is a section configured to support from below, the object to be heated that is supported on the support surface 20A. The bottom part 21 is a section which is provided below (on the bottom side of) the support surface 20A and projects from the support surface 20A in the direction of the movable heater plate 95A. In the first embodiments, the heat shrink sleeve 7 having an elliptical cross-section is the object to be heated, and the lower edge of the heat shrink sleeve 7 (an end part of the heat shrink sleeve 7 on the major axis) is supported by the bottom part 21. When the bottom part 21 supports the heat shrink sleeve 7 from below, the heating part 95 is able to stably heat the heat shrink sleeve 7. The amount of projection of the bottom part 21 from the support surface 20A is smaller than the minor axis of the heat shrink sleeve 7 having an elliptical cross-section. In this way, the heat shrink sleeve 7 and the movable heater plate 95A can come into contact with each other while the bottom part 21 can support the heat shrink sleeve 7.

The bottom part 21 includes a protruding part 21A. The protruding part 21A is a section protruding at the top of the bottom part 21. When the protruding part 21A supports the heat shrink sleeve 7 from below, the bottom part 21 is brought into non-contact with the optical fibers 1 (the bottom part 21 is prevented from coming into contact with the optical fibers 1) in a region other than the protruding part 21A, thus reducing heating of the optical fibers 1.

The plate part 20 further includes a restriction part 22. The restriction part 22 is a section configured to restrict the longitudinal position of the heat shrink sleeve 7. When an end part (the left end herein) of the heat shrink sleeve 7 is fit to the restriction part 22, the heat shrink sleeve 7 is located at a predetermined position with respect to the heater 90 (especially the heating part 95). The jig 10 may not include the restriction part 22.

The plate part 20 is configured to be able to insert the heat shrink sleeve 7 from above. Because the jig 10 is mounted in the insertion opening of the heater 90 from above, when the plate part 20 of the jig 10 is configured to be able to insert the heat shrink sleeve 7 from above, the heat shrink sleeve 7 can be inserted into and extracted from the jig 10 with the jig 10 being mounted in the heater 90. This facilitates the operation of heating multiple heat shrink sleeves 7.

The first retaining part 30 is a section configured to face the first clamp part 961 and retain a member extending from a longitudinal end of the heat shrink sleeve 7. In other words, the first retaining part 30 is a section configured to retain an object to be clamped which faces the first clamp part 961. In the first embodiments, plural optical fibers 1 aligned in a tape-like manner extend from a longitudinal end of the heat shrink sleeve 7, and the first retaining part 30 retains the plural optical fibers 1 (the object to be clamped) aligned in a tape-like manner. The first retaining part 30 is located to the left of the plate part 20. When the jig 10 is set in the heater 90, the first retaining part 30 is located between the paired clampers 96A of the first clamp part 961. Specifically, when the jig 10 is set in the heater 90, one of the surfaces of the first retaining part 30 faces one of the paired clamper 96A of the first clamp part 961 while the other surface of the first retaining part 30 faces the other clamper 96A. As described later, the first retaining part 30 restricts the range of movement of the movable clamper 96A of the first clamp part 961, which prevents the plural optical fibers 1 from twisting. The first retaining part 30 includes a support surface 30A and a bottom part 31.

The support surface 30A is a surface configured to support the plural optical fibers 1 aligned in a tape-like manner. The support surface 30A of the first retaining part 30 is substantially parallel to the support surface 20A of the plate part 20. When the heat shrink sleeve 7 is set in the jig 10, the direction that the plural optical fibers 1 supported by the first retaining part 30 are aligned is the same as the direction that the plural optical fibers 1 are aligned within the heat shrink sleeve 7. The support surface 30A faces the movable clamper 96A. The plural optical fibers 1 are sandwiched and held between the support surface 30A and clamper 96A. When the movable clamper 96A moves and sandwiches the plural optical fibers 1 against the support surface 30A, the movable clamper 96A is prevented from further moving due to the resistive force from the support surface 30A. This prevents the portion of the plural optical fibers 1 aligned in a tape-like manner within the heat shrink sleeve 7 from twisting relative to the portion of the plural optical fibers 1 retained by the first clamp part 961 in the process of heating the heat shrink sleeve 7 having an elliptical cross-section with the heating part 95.

The bottom part 31 is a section configured to support from below, the plural optical fibers 1 supported by the support surface 30A. The bottom part 31 is a section protruding from the support surface 30A in the direction of the movable clamper 96A. When the bottom part 31 supports the plural optical fibers 1 from below, the first clamp part 961 is able to stably grip the plural optical fibers 1 (the plural optical fibers 1 are sandwiched and held between the support surface 30A and movable clamper 96A with a stable orientation).

The first retaining part 30 includes a hook part 32. The hook part 32 is a section on which the plural optical fibers 1 aligned in a tape-like manner are hung. When the plural optical fibers 1 are hung on the hook part 32, the plural optical fibers 1 are prevented from falling from the support surface 30A.

The second retaining part 40 is a section configured to face the second clamp part 962 and retain a member extending from the other longitudinal end of the heat shrink sleeve 7. In other words, the second retaining part 40 is a section configured to retain the object to be clamped which faces the second clamp part 962. In the first embodiments, a ferrule 71 with optical fibers extends from the right longitudinal end of the heat shrink sleeve 7, and the second retaining part 40 retains the ferrule 71 (the object to be clamped). The second retaining part 40 is located to the right of the plate part 20. When the jig 10 is set in the heater 90, the second retaining part 40 is located between the paired clampers 96A of the second clamp part 962. Specifically, when the jig 10 is set in the heater 90, one of the surfaces of the second retaining part 40 faces one of the paired clampers 96A of the second clamp part 962 while the other surface of the second retaining part 40 faces the other clamper 96A. As described later, the second retaining part 40 restricts the range of movement of the movable clamper 96A of the second clamp part 962, which prevents the plural optical fibers 1 from twisting. The second retaining part 40 includes a bottom part 41 and an abutment part 42.

The bottom part 41 is a section configured to support the ferrule 71 from below. The bottom part 41 supports the ferrule 71, and the abutment part 42 comes into contact with the ferrule 71. The ferrule 71 is thereby located at a predetermined position with respect to the jig 10.

A tube 5 is attached to the ferrule 71. The tube 5 is a section that the operator grasps in the process of applying tension to the fusion-splice point. The tube 5 is attached to the opposite side of the ferrule 71 to the side where the optical fibers 1 extend. In other words, the tube 5 is attached to the ferrule 71 so as to extend from the end face's side of the ferrule 71 (also see FIG. 11A). The second retaining part 40 of the first embodiments is able to retain the ferrule 71 with the tube 5 attached thereto. The second retaining part 40 may retain the ferrule 71 to which the tube 5 is not attached. The second retaining part 40 may retain the plural optical fibers 1 aligned in a tape-like manner similarly to the first retaining part 30.

The abutment part 42 is a section on which the end (an end part from which the optical fibers 1 extend) of the ferrule 71 is abutted. When the end part of the ferrule 71 is brought into contact with the abutment part 42, the ferrule 71 is located at a predetermined position with respect to the jig 10. The abutment part 42 thus serves as a positioning part (i.e., "positioner"). The abutment part 42 is also a section with which the movable clamper 96A of the second clamp part 962 comes into contact. When the movable clamper 96A moves and comes into contact with the abutment part 42, the movable clamper 96A is prevented from further moving. This prevents the portion of the plural optical fibers 1 aligned in a tape-like manner within the heat shrink sleeve 7 from twisting relative to the portion of the plural optical fibers 1 extending from the ferrule 71 retained by the second clamp part 962 in the process of heating the heat shrink sleeve 7 having an elliptical cross-section with the heating part 95. In the first embodiments, the abutment part 42 comes into direct contact with the clamper 96A of the second clamp part 962. This prevents the clamper 96A from pressing the ferrule 71, thus protecting the ferrule 71. Instead of including the abutment part 42, the second retaining part 40 may be configured such that the ferrule 71 is supported by the support surface 30A like in the first retaining part 30 and the movable clamper 96A comes into contact with the ferrule 71.

The first retaining part 30 and the second retaining part 40 are configured such that the plural optical fibers 1 and the ferrule 71 can be inserted therein from above. For the jig to be mounted in the insertion opening of the heater 90 from above, the plate part 20 of the jig 10 is configured such that the heat shrink sleeve 7 can be inserted therein from above as already described, and the first retaining part 30 and the second retaining part 40 are configured such that the plural optical fibers 1 and the ferrule 71 can be inserted therein from above. The heat shrink sleeve 7 thereby can be inserted into and extracted from the jig 10 with the jig 10 being mounted in the heater 90. This facilitates the operation of heating multiple heat shrink sleeves 7.

The arm parts 50 are sections configured to keep the orientation of the body part 11 (the plate part 20 and the first retaining part 30 and the second retaining part 40) with respect to the heater 90. When the arm parts 50 are hung on the heater 90, the body part 11 is mounted in the accommodation part 93 of the heater 90 with a predetermined orientation (see FIG. 6B). With this, the body part 11 (the plate part 20 and the first retaining part 30 and the second retaining part 40) can have a predetermined orientation with respect to the heater 90. The paired arm parts 50 are located at both longitudinal ends (the right and left ends) of the body part 11. When the jig 10 is set in the heater 90, the arm parts 50 are located outside of the side walls of the heater 90 (see FIG. 6B). The jig 10 may include only one arm part 50 at an end part of the body part 11. Providing the arm parts 50 at both end parts of the body part 11 like the first embodiments can stabilize the orientation of the body part 11. The jig 10 may not include any arm part 50. Each arm part 50 includes an engagement part 51 and a hanging part 54.

The engagement parts 51 are sections configured to be engaged with the heater 90. In the first embodiments, protrusion parts 80A are provided in the right and left sides of the housing of the fusion splicer 80, and engagement holes 80B are provided on side surfaces of the protrusion parts 80A. The engagement parts 51 are configured to be inserted into the respective engagement holes 80B. When the engagement parts 51 are inserted into the engagement holes 80B, the arm parts 50 are engaged with the protrusion parts 80A. The way of engaging the engagement parts 51 with the heater 90 is not limited to inserting the engagement parts 51 into the engagement holes 80B. For example, the engagement parts 51 may be hooked on the rear side of the protrusion parts 80A so that the engagement parts 51 are engaged with the heater 90 to maintain the orientation of the body part 11 (the plate part 20 and the first retaining part 30 and the second retaining part 40) with respect to the heater 90. The engagement of the engagement parts 51 with the heater 90 keeps the orientation of the body part 11 (that is, prevents the body part 11 from inclining within the accommodation part 93) when the body part 11 receives a force from the movable portions of the heating part 95 and the clamp parts 96.

Each engagement part 51 includes an alignment part 52 and an operation part 53. The alignment parts 52 are bar-shaped sections extending along the right-left direction. The alignment parts 52 are configured to stabilize the orientation of the jig 10 along the right-left direction. When the engagement parts 51 are engaged with the heater 90 (when the engagement parts 51 are inserted into the engagement holes 80B), the paired alignment parts 52 are in contact with front surfaces of the protrusion parts 80A of the heater 90, stabilizing the orientation of the body part 11 along the right-left direction. The operation parts 53 are sections extending outward, to the right and left of the respective arm parts 50. The operation parts 53 are sections configured to be operated for mounting and demounting the jig 10. The arm parts 50 are configured to be an elastic deformation. The operator grasps the right and left operation parts 53 and pulls the same outward to deform the arm parts 50 and to release engagement between the engagement parts 51 and the engagement holes 80B.

Figure 9A:
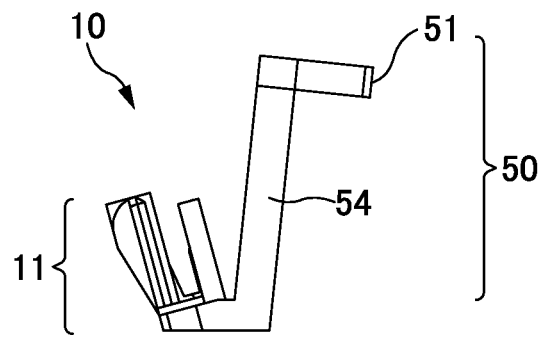
FIGS. 9A and 9B are explanatory diagrams of a hanging part 54, FIG. 9A being a side view of the jig 10, FIG. 9B being a side view of the heater 90 with the jig 10 set therein.
Figure 9B:
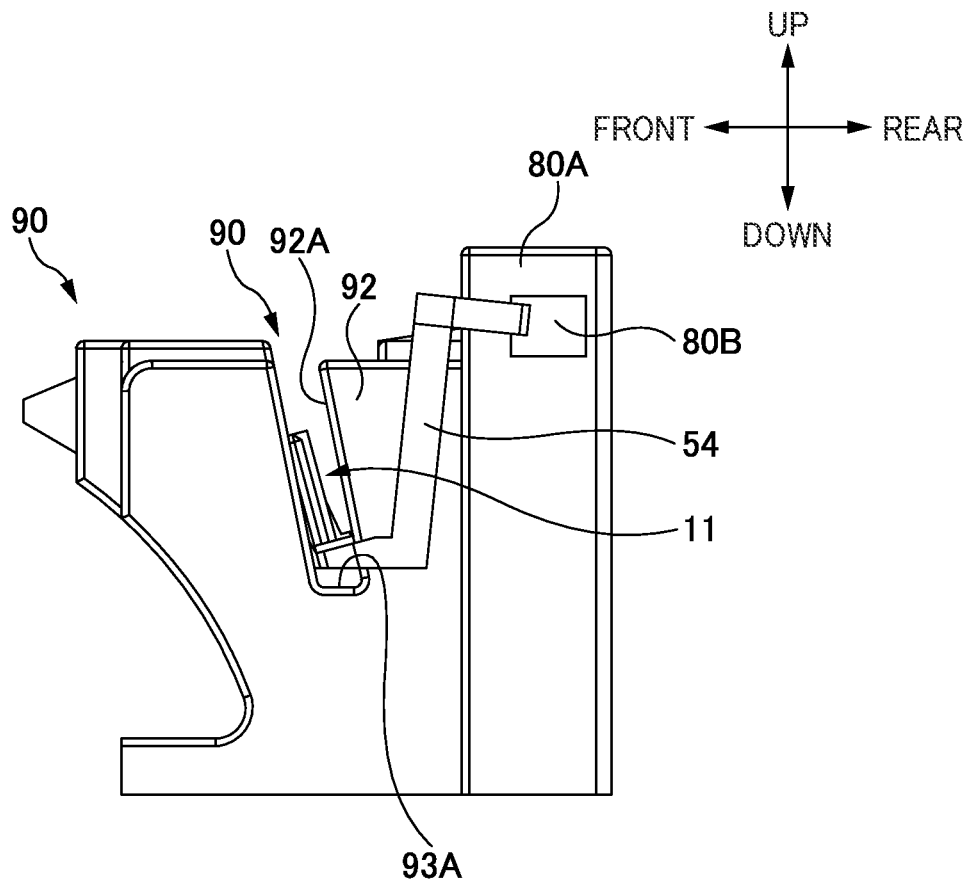

FIGS. 9A and 9B are explanatory diagrams of the hanging parts 54. FIG. 9A is a side view of the jig 10. FIG. 9B is a side view of the heater 90 with the jig 10 set therein. FIG. 9B illustrates the body part 11 being hung on the heater 90 but not placed on a bottom surface 93A of the accommodation part 93.

The hanging parts 54 are sections configured to hang the body part 11 on the heater 90. By hanging the body part 11 on the heater 90, the body part 11 can be set at a normal position with respect to the heater 90. Instead of hanging the body part 11, the body part 11 may be placed on the bottom surface 93A of the accommodation part 93 of the heater 90. However, if the body part 11 is placed on the bottom surface 93A of the accommodation part 93, the body part 11 could be set in a tilted position because of the structure where the bottom surface 93A of the accommodation part 93 is difficult to see. In the first embodiments, the body part 11 is hung on the heater 90, and it is therefore possible to confirm that the body part 11 is set at a normal position with respect to the heater 90 by checking the engagement of the engagement parts 51 with the heater 90.

Use of Jig 10

Herein, an assembly method (a manufacturing method) of an optical connector 70 is described. The following description includes a method of heating the heat shrink sleeve 7 by using the jig 10 (the method of protecting the fusion-splice point).

Figure 10:
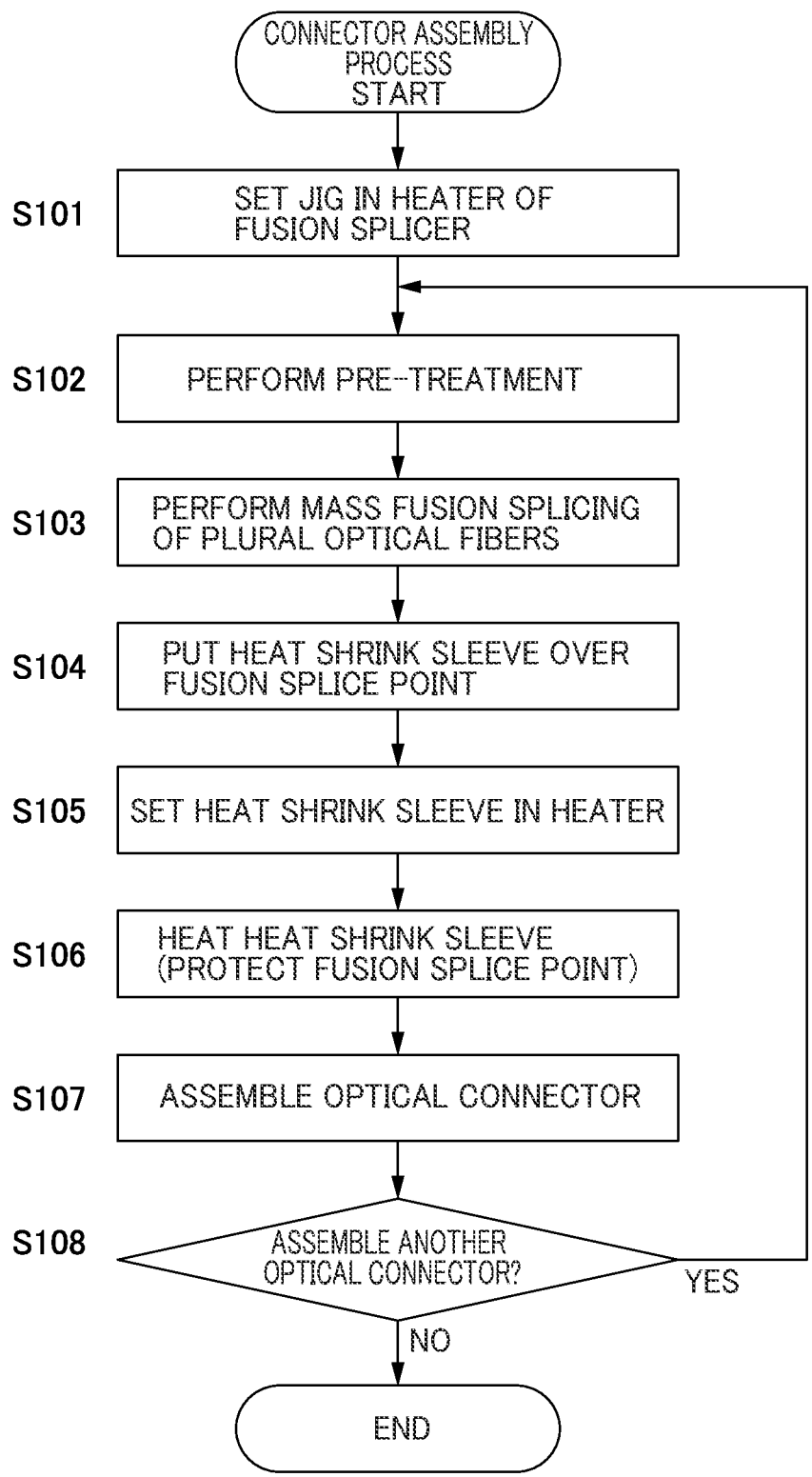
FIG. 10 is a flowchart of an assembly process of an optical connector 70.

FIG. 10 is a flowchart of an assembly process of the optical connector 70. Herein, it is assumed that a fusion splice-on optical connector 70 (see FIG. 13) is assembled to an end part of an optical cable. The operator prepares the fusion splicer 80 including the aforementioned heater 90 and the aforementioned jig 10 in advance.

The operator first sets the jig 10 in the heater 90 of the fusion splicer 80 (S101). In this process, the operator inserts the body part 11 of the jig 10 into the accommodation part 93 of the heater 90 from above the insertion opening of the heater 90 to mount the jig 10 in the heater 90. When the jig 10 is set in the heater 90, the plate part 20 faces the heating part 95 of the heater 90, the first retaining part 30 faces the first clamp part 961, and the second retaining part 40 faces the second clamp part 962.

In the process of setting the jig 10 in the heater 90, the operator grasps the operation parts 53 of the right and left arm parts 50 of the jig 10 and pulls the same outward to elastically deform the arm parts 50 while inserting the engagement parts 51 of the arm parts 50 into the engagement holes 80B of the heater 90. The engagement parts 51 are thereby engaged with the heater 90. As illustrated in FIG. 9B, when the engagement parts 51 are engaged with the heater 90, the body part 11 is hung on the heater 90 through the hanging parts 54. The body part 11 is thereby set at a normal position with respect to the heater 90. By checking the engagement of the engagement parts 51 with the heater 90, the operator is able to confirm that the body part 11 is set at a normal position with respect to the heater 90.

Next, the operator performs pre-treatments (S102). For example, the operator prepares a connector kit as a pre-treatment. The connector kit is a set of components constituting the optical connector 70. The connector kit of the first embodiments includes the ferrule 71 with optical fibers, a housing 72, the heat shrink sleeve 7, a spring 74, a spring push 75, and a boot 76 (see FIG. 13). The configuration of the connector kit is not limited to this configuration. As another pre-treatment, the operator inserts an optical cable through the boot 76 in advance. The operator also strips plural optical fibers 1 from the optical cable and inserts the stripped plural optical fibers 1 through the spring push 75 (see FIG. 13), the spring 74, and the heat shrink sleeve 7 in advance. As still another pre-treatment, the operator performs coating removal of the plural optical fibers 1, cleaving of an end part of each optical fiber 1 (each bare optical fiber), and the like.

Figure 11A:
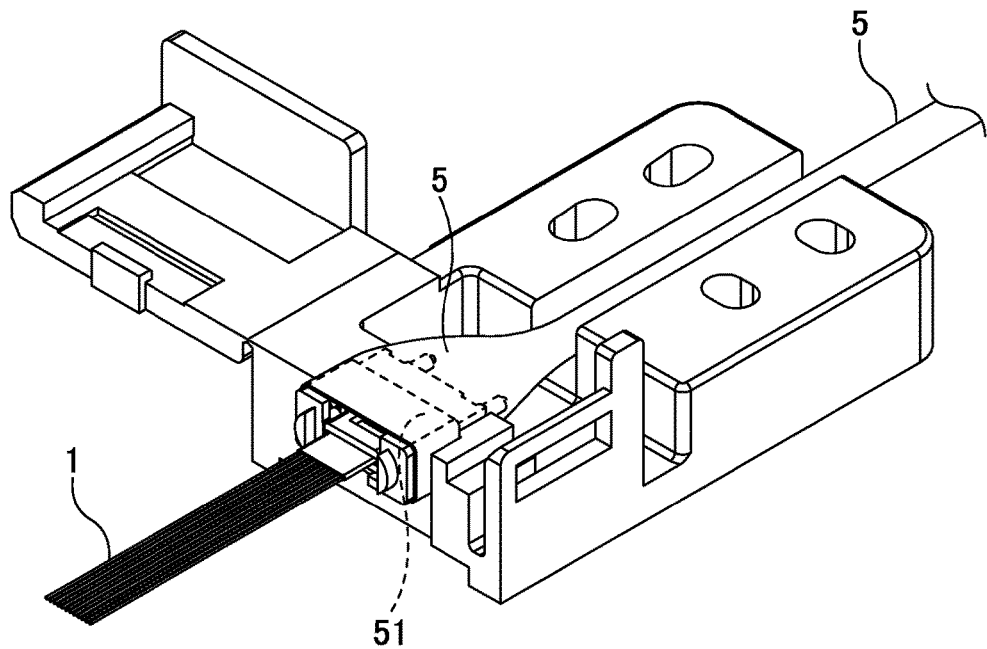
FIG. 11A is an explanatory diagram of a ferrule holder.
Figure 11B:
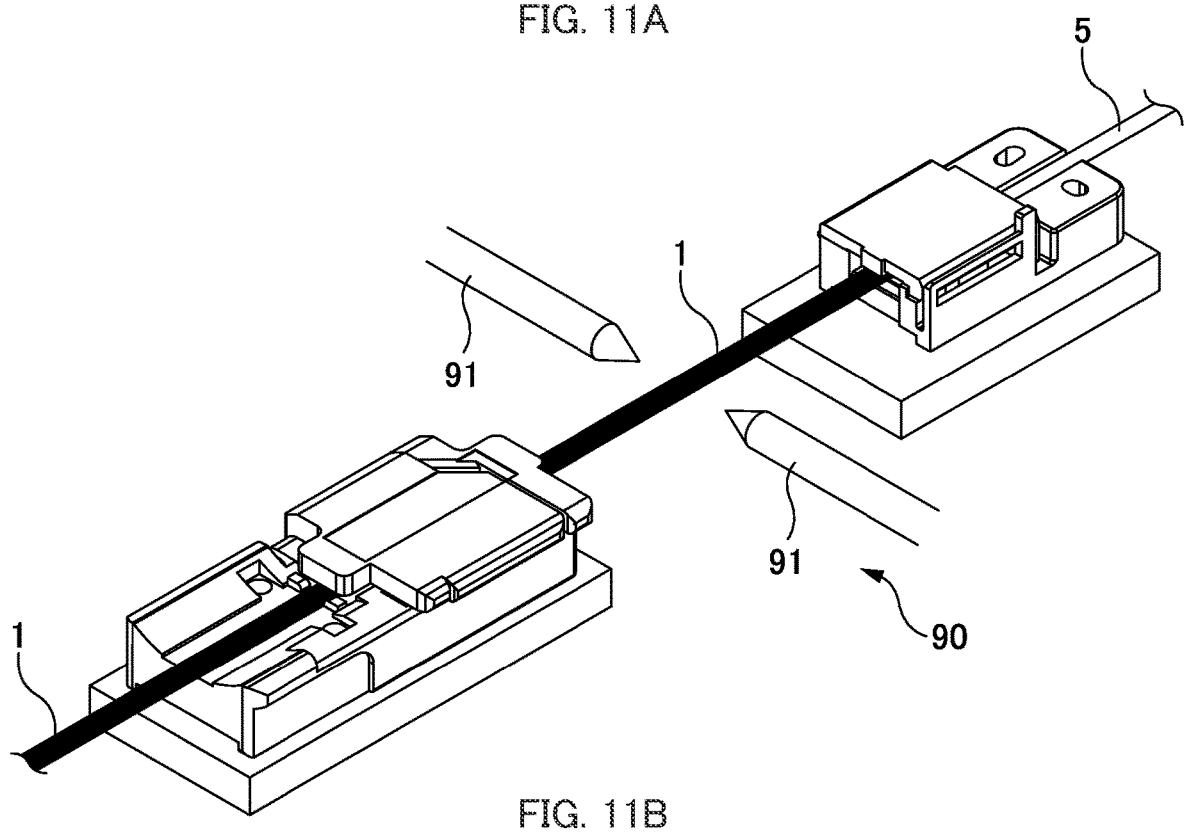
FIG. 11B is an explanatory diagram of a situation where plural optical fibers 1 are set in a fusion-splice device 81.

Next, the operator performs mass fusion splicing of the plural optical fibers 1 (S103). FIGS. 11A and 11B are explanatory diagrams of mass fusion splicing of the plural optical fibers 1.

FIG. 11A is an explanatory diagram of a ferrule holder. As illustrated in FIG. 11A, the operator sets the ferrule 71 with optical fibers in the ferrule holder. The tube 5 is attached to the ferrule 71 in advance. The plural optical fibers 1 (the optical fibers 1 retained in the ferrule 71) extend from the ferrule holder. The tube 5 extends from the opposite side of the ferrule holder to the side where the plural optical fibers 1 extend.

FIG. 11B is an explanatory diagram of a situation where the plural optical fibers 1 are set in the fusion-splice device 81. As illustrated in FIG. 11B, the operator sets a holder retaining the plural optical fibers 1 stripped from the optical cable and the ferrule holder retaining the ferrule 71 with optical fibers in the fusion-splice device 81. The end faces of the optical fibers 1 are thereby located so as to face each other in the vicinity of the pair of electrodes 81A. The fusion-splice device 81 produces an arc discharge with the pair of electrodes 81A for fusion splicing of optical fibers.

Next, the operator puts the heat shrink sleeve 7 over the fusion-splice point (S104). In this process, the operator puts the heat shrink sleeve 7 over the fusion-splice point while pulling the optical fibers 1 taken out from the holder and the tube 5 (the tube 5 attached to the ferrule 71) taken out from the ferrule holder to apply tension to the fusion-splice point.

Next, the operator sets the heat shrink sleeve 7 in the heater 90 (S105). In this process, while applying tension to the fusion-splice point, the operator inserts the heat shrink sleeve 7 into the accommodation part 93 of the heater 90 from above the insertion opening of the heater 90 and sets the heat shrink sleeve 7 on the plate part 20 of the jig 10 previously set in the heater 90. The operator causes the plate part 20 to support the heat shrink sleeve 7, causes the first retaining part 30 to retain the plural optical fibers 1 (the optical fibers 1 stripped from the optical cable), and causes the second retaining part 40 to retain the ferrule 71 (the ferrule 71 with optical fibers). When the heat shrink sleeve 7 is supported by the plate part 20, the heat shrink sleeve 7 is located between the support surface 20A of the plate part 20 and the movable heater plate 95A of the heating part 95. When the plural optical fibers 1 (the optical fibers 1 stripped from the optical cable) are retained in the first retaining part 30, the plural optical fibers 1 are located between the support surface 30A of the first retaining part 30 and the movable clamper 96A of the first clamp part 961.

In the first embodiments, in the process of setting the heat shrink sleeve 7 in the heater 90, while applying tension to the fusion-splice point, the operator inserts the heat shrink sleeve 7 into the accommodation part 93 of the heater 90 from above the insertion opening of the heater 90 and inserts the heat shrink sleeve 7 from above the plate part 20 of the jig 10 (the jig 10 set in the heater 90 in S101). In addition, the operator inserts the plural optical fibers 1 (the optical fibers 1 stripped from the optical cable) from above the first retaining part 30 and inserts the ferrule 71 (the ferrule 71 with optical fibers) from above the second retaining part 40. In such a manner, in the first embodiments, the heat shrink sleeve 7 and the members extending from the heat shrink sleeve 7 can be set in the jig 10 with the jig 10 being mounted in the heater 90.

Figure 12:
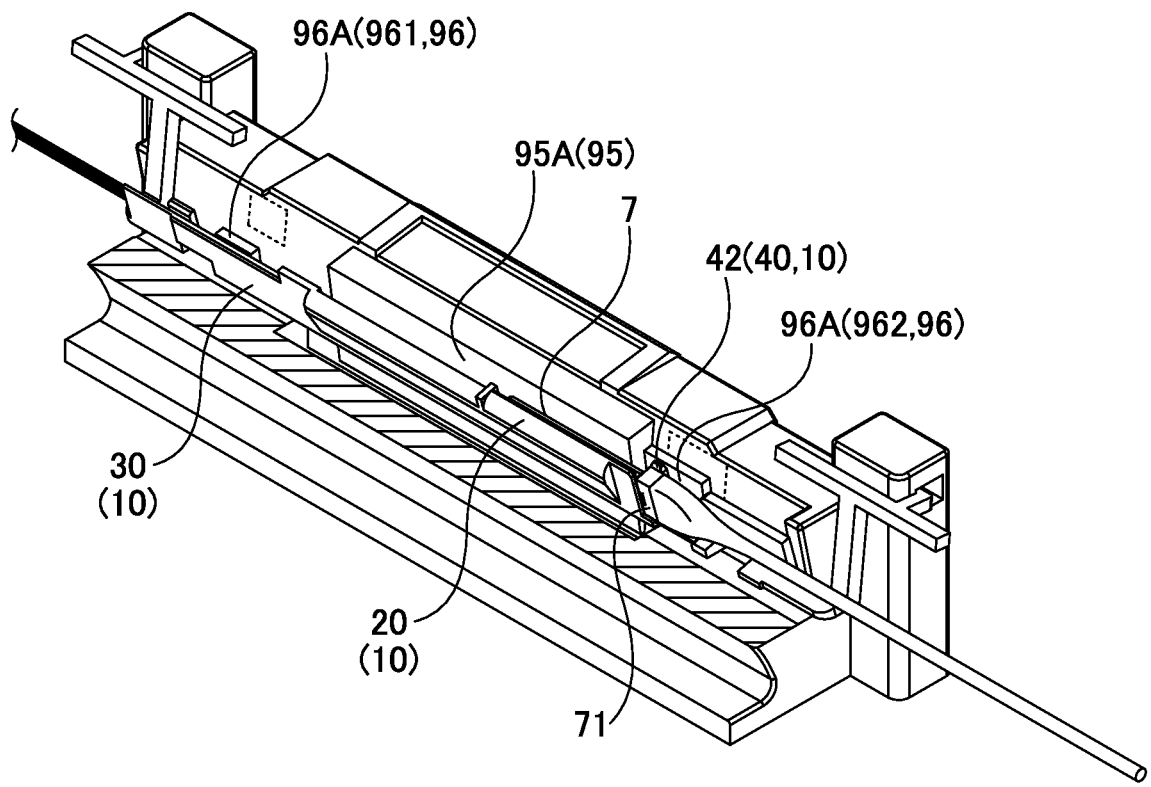
FIG. 12 is an explanatory diagram of heating in the embodiments.

Next, the operator heats the heat shrink sleeve 7 (S106). FIG. 12 is an explanatory diagram of heating in the first embodiments.

The heat shrink sleeve 7 is sandwiched and held between the support surface 20A of the plate part 20 and the movable heater plate 95A and is heated. When the movable heater plate 95A moves and sandwiches the heat shrink sleeve 7 against the support surface 20A, the movable heater plate 95A is prevented from further moving due to a resistive force from the support surface 20A. The plural optical fibers 1 (the left optical fibers 1 in the drawing) extending from the heat shrink sleeve 7 are clamped between the support surface 30A of the first retaining part 30 and the movable clamper 96A. When the movable clamper 96A moves and sandwiches the plural optical fibers 1 against the support surface 30A, the movable clamper 96A is prevented from further moving due to a resistive force from the support surface 30A. The ferrule 71 with optical fibers that extends from the heat shrink sleeve 7 is retained by the second retaining part 40. When the movable clamper 96A of the second clamp part 962 moves and comes into contact with the abutment part 42, the movable clamper 96A is prevented from further moving. In the first embodiments, the plate part 20 and the first retaining part 30 and the second retaining part 40 restrict the range of movement of the movable portions of the heating part 95 and the clamp parts 96 (the first clamp part 961 and the second clamp part 962).

As described above, in the first embodiments, use of the jig 10 including the plate part 20 and the first retaining part 30 and the second retaining part 40 prevents the portion of the plural optical fibers 1 within the heat shrink sleeve 7 from twisting relative to the portion of the optical fibers 1 in the first retaining part 30 or the portion of the optical fibers 1 in the second retaining part 40 (the optical fibers 1 retained in the ferrule 71) in the process of heating the heat shrink sleeve 7 having an elliptical cross-section with the heating part 95. This prevents the plural optical fibers 1 aligned in a tape-like manner from being fixed in a twisted state after the heat shrink sleeve 7 is heated, thus minimizing an increase in transmission loss of the optical fibers 1.

Figure 13:
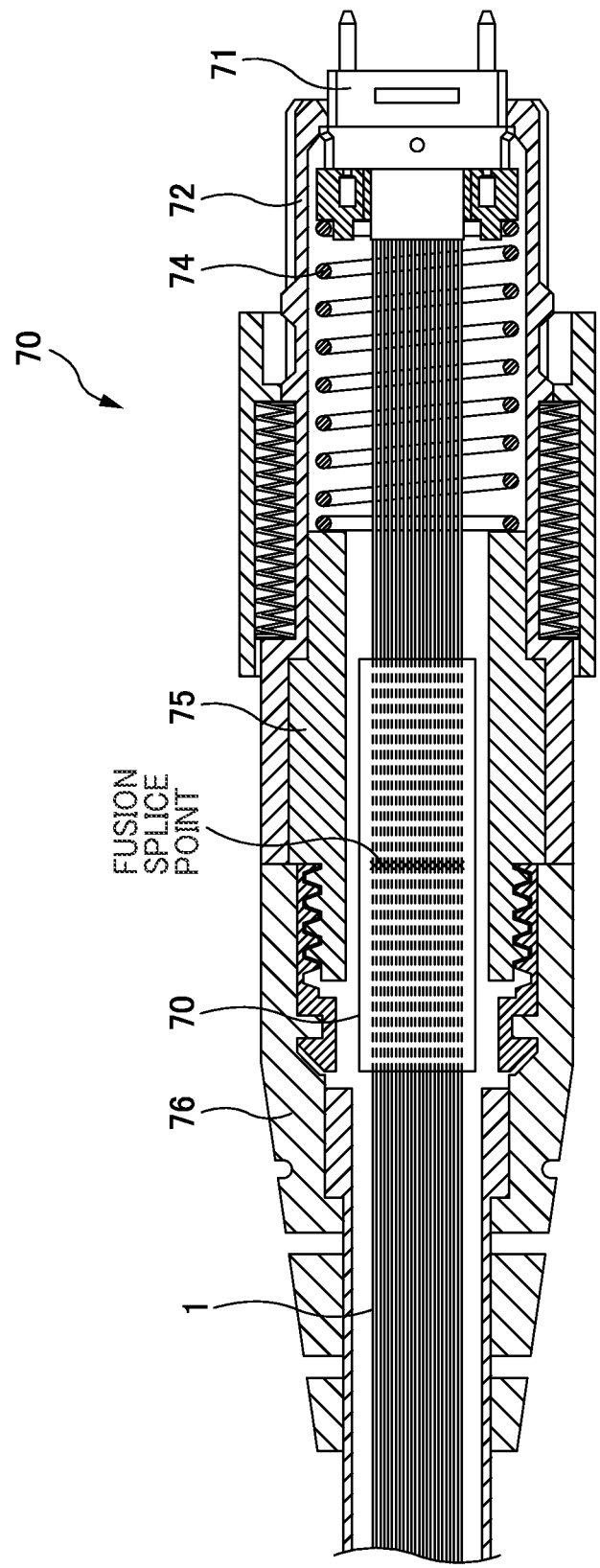
FIG. 13 is a sectional view of the optical connector 70.

The operator lastly assembles the optical connector 70 (S107). FIG. 13 is a sectional view of the optical connector 70. The operator accommodates the ferrule 71, the heat shrink sleeve 7, and the spring 74 in the housing 72 and attaches the spring push 75 to the housing 72. When the spring push 75 is attached to the housing 72, the spring 74 is compressed, and the ferrule 71 is pressed and is accommodated in the housing 72 so as to be retracted. The operator then attaches the boot 76 to the housing 72 to protect the optical fibers 1 (the optical cable). The assembly process of the optical connector 70 is thus completed.

After the assembly of the optical connector 70, the operator repeatedly performs the operations of S102 to S107 in the case that it is necessary to assemble another optical connector 70 (S108). In the first embodiments, the heat shrink sleeve 7 can be inserted into and extracted from the heater 90 with the jig 10 being mounted in the heater 90. This facilitates repeating the operations of S105 and S106. When it is unnecessary to assemble another optical connector 70, the operator terminates the assembly process (S108).

Second and Third Embodiments

FIG. 14A is an explanatory diagram of a jig of second embodiments. The jig 10 of the second embodiments does not include the arm parts 50. In the second embodiments, the jig 10 is placed on the bottom surface 93A of the accommodation part 93, instead of being hung on the heater 90, to be set in the heater 90.

FIG. 14B is an explanatory diagram of a jig 10 of third embodiments. In the jig 10 of the third embodiments, the second retaining part 40 is configured to retain plural optical fibers aligned in a tape-like manner, similar to the first retaining part 30, instead of retaining the ferrule 71, and includes a hook part 43.

Also in the aforementioned second and third embodiments, the jig 10 includes the plate part 20 and the first retaining part 30 and the second retaining part 40, and the plate part 20 and the first retaining part 30 and the second retaining part 40 are able to restrict the range of movement of the movable portions of the heating part 95 and the clamp parts 96 (the first clamp part 961 and the second clamp part 962). Using the jig 10 of the second and the third embodiments also prevents the portion of the plural optical fibers 1 within the heat shrink sleeve 7 from twisting relative to the portion of the plural optical fibers 1 in the first retaining part 30 or the portion of the plural optical fibers 1 in the second retaining part 40 (the optical fibers 1 retained by the ferrule 71) in the process of heating the heat shrink sleeve 7 having an elliptical cross-section with the heating part 95. In the second and third embodiments, it is therefore possible to prevent the plural optical fibers 1 aligned in a tape-like manner from being fixed in a twisted state after the heat shrink sleeve 7 is heated, thus minimizing an increase in transmission loss of the optical fibers 1.

Fourth Embodiments

FIGS. 15A and 15B are explanatory diagrams of a jig 6 for a ferrule. The drawings illustrate with dotted lines, the ferrule 71 with optical fibers to which the jig 6 for the ferrule is attached.

The jig 6 for the ferrule is a member with which the operator applies tension to the fusion-splice point after fusion splicing. The jig 6 for the ferrule is a member to be attached to the ferrule 71 instead of the tube 5 in the aforementioned embodiments (see FIGS. 7B, 8B, and 11A). The jig 6 for the ferrule includes a ferrule retaining part 6A and an operation part 6B. The ferrule retaining part 6A is a section configured to retain the ferrule 71. The operation part 6B is a section longitudinally extending from the ferrule retaining part 6A and is a section configured to be operated by the operator.

For fusion splicing, the operator sets the ferrule 71 with optical fibers in the ferrule holder with the jig 6 for the ferrule attached to the ferrule 71 in advance (see FIG. 11A). Instead of the tube 5 in FIG. 11A, the operation part 6B of the jig 6 for the ferrule extends from the opposite side of the ferrule holder to the side where the plural optical fibers 1 extend. In the process of putting the heat shrink sleeve 7 over the fusion-splice point after fusion splicing, the operator pulls the optical fibers 1 taken out of the holder and the jig 6 for the ferrule (specifically, the operation part 6B) taken out of the ferrule holder to apply tension to the fusion-splice point while putting the heat shrink sleeve 7 over the fusion-splice point. After putting the heat shrink sleeve 7 over the fusion-splice point, the operator maintains tension to the fusion-splice point while inserting the heat shrink sleeve 7 in the accommodation part 93 of the heater 90 from above the insertion opening of the heater 90 and setting the heat shrink sleeve 7 in the jig 10 that is set in the heater 90 in advance.

FIGS. 16A and 16B are explanatory diagrams of a situation where the heat shrink sleeve 7 is set in the jig 10 using the jig 6 for the ferrule.

As illustrated in FIGS. 16A and 16B, the second retaining part 40 is able to retain the ferrule 71 with the jig 6 for the ferrule attached thereto. Herein, the second retaining part 40 retains the ferrule retaining part 6A of the jig 6 for the ferrule to indirectly retain the ferrule 71.

The jig 10 includes the plate part 20 and the first retaining part 30 and the second retaining part 40. By using the thus-configured jig 10, even in the case where the jig 6 for the ferrule is used, the plate part 20 and the first retaining part 30 and the second retaining part 40 restrict the range of movement of the movable portions of the heating part 95 and clamp parts 96 (the first clamp part 961 and the second clamp part 962) in the process of heating the heat shrink sleeve 7 having an elliptical cross-section with the heating part 95. This prevents the portion of the plural optical fibers 1 within the heat shrink sleeve 7 from twisting relative to the portion of the plural optical fibers 1 in the first retaining part 30 or the portion of the plural optical fibers 1 in the second retaining part 40 (the optical fibers 1 retained in the ferrule 71). It is therefore possible to prevent the plural optical fibers 1 aligned in a tape-like manner from being fixed in a twisted state after the heat shrink sleeve 7 is heated, thus minimizing an increase in transmission loss of the optical fibers 1.

Fifth Embodiments

In the aforementioned first to fourth embodiments, the plate part 20 is located so as to face substantially the entire region of the heating part 95 along the longitudinal direction (see FIG. 12). In the first to fourth embodiments, therefore, the plate part 20 is provided in the region where the heat shrink sleeve 7 as the object to be heated is located and is configured to support the heat shrink sleeve 7 as the object to be heated (see FIGS. 7B and 8B). In the first to fourth embodiments, during the process of heating the heat shrink sleeve 7 with the heating part 95, the plate part 20 is interposed between the heat shrink sleeve 7 and the fixed heater plate 95A of the heating part 95. This makes it difficult for the fixed heater plate 95A to heat the heat shrink sleeve 7. Fifth embodiments described below are configured such that the heat shrink sleeve 7 as the object to be heated can be set in the heater 90 while being exposed to the heating part 95.

Figure 19:
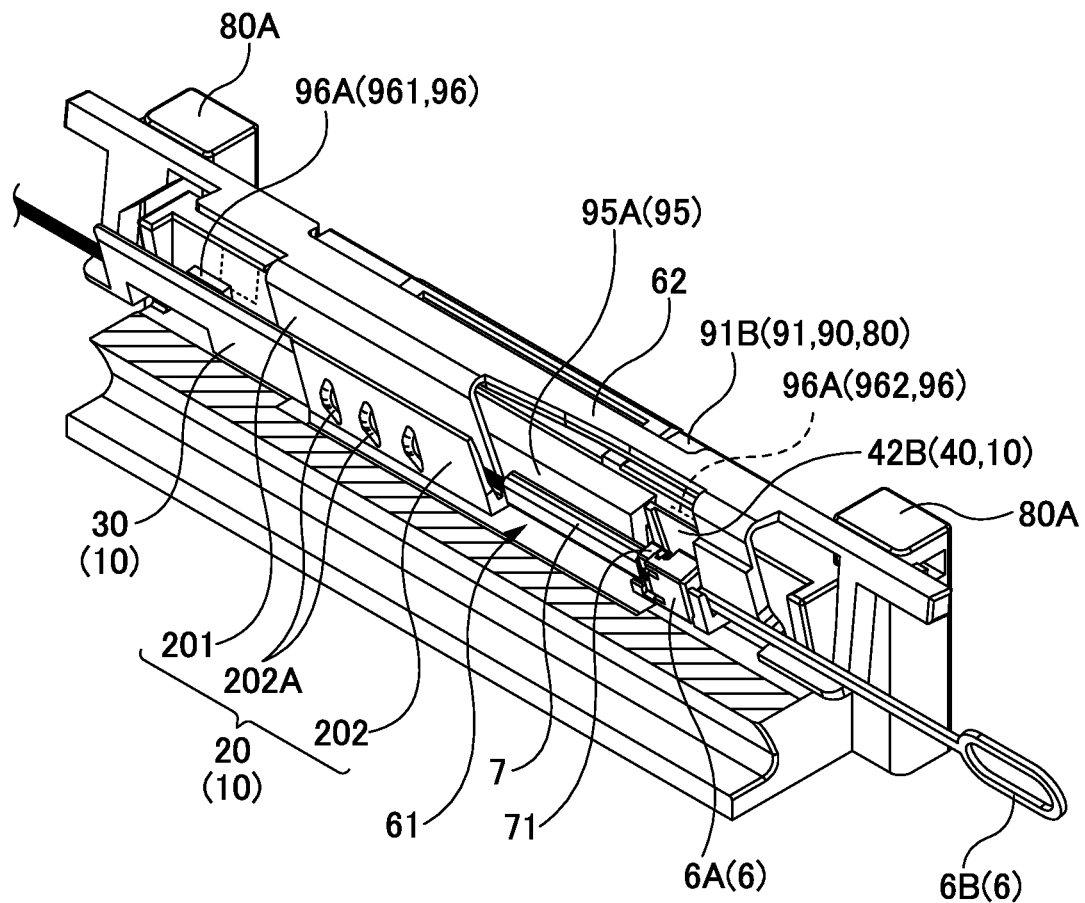
FIG. 19 is an explanatory diagram of heating in the embodiments.

FIG. 17A is a perspective view of a jig 10 of the fifth embodiments. FIG. 17B is an explanatory diagram of a situation where the heat shrink sleeve 7 is set in the jig 10 illustrated in FIG. 17A. FIG. 18A is another perspective view of the jig 10 of the fifth embodiments. FIG. 18B is another explanatory diagram of a situation where the heat shrink sleeve 7 is set in the jig 10 illustrated in FIG. 18A. FIG. 19 is an explanatory diagram of heating in the fifth embodiments. In the drawings, sections of the jig 10 of the fifth embodiments that serve the same functions as those of the jig 10 of the aforementioned embodiments are given the same reference characters, and the description thereof is omitted.

The jig 10 of the fifth embodiments is a member mountable on the heater 90 of the fusion splicer 80 in the same manner as the aforementioned jigs 10 and is a member (a jig for a fusion splicer; an attachment) for setting the object to be heated in the heater 90. Similarly in the fifth embodiments, the jig 10 includes the plate part 20, the first retaining part 30, and the second retaining part 40. The jig 10 of the fifth embodiments includes an exposure part 61 and a connecting part (i.e., "connector") 62.

In the fifth embodiments, the plate part 20 is a plate-like member configured to face the heating part 95 of the heater 90. The plate part 20 of the fifth embodiments does not support the heat shrink sleeve 7 as the object to be heated and retains a member (plural optical fibers 1) longitudinally extending from the object to be heated. The plate part 20 of the fifth embodiments is a member having a U-shaped cross-section. The plate part 20 includes a first plate member 201, a second plate member 202, and a bottom part 203.

The first plate member 201 is a plate-like member configured to face the movable heater plate 95A of the heating part 95. The second plate member 202 is a plate-like member configured to face the fixed heater plate 95A of the heating part 95. There is a gap between the first plate member 201 and the second plate member 202. In the gap, the plural optical fibers 1 (the member longitudinally extending from the object to be heated) are located. When the jig 10 is set in the heater 90, the first plate member 201 and the second plate member 202 are located between the paired heater plates 95A of the heating part 95. In the fifth embodiments, the plural optical fibers 1 (the member longitudinally extending from the object to be heated) are retained between the first plate member 201 and the second plate member 202, which reduces heating of the optical fibers 1. In the fifth embodiments, the first plate member 201 comes into contact with the movable heater plate 95A of the heating part 95 to restrict the range of movement of the movable heater plate 95A. In the aforementioned embodiments, the plate part 20 restricts the range of movement of the movable heater plate 95A with the object to be heated (the heat shrink sleeve 7) interposed between the plate part 20 and movable heater plate 95A. In the fifth embodiments, the plate part 20 (specifically, the first plate member 201) comes into direct contact with the movable heater plate 95A of the heating part 95 and restricts the range of movement of the movable heater plate 95A.

The second plate member 202 includes protrusions 202A on the surface facing the fixed heater plate 95A. The protrusions 202A are sections configured to come into contact with the fixed heater plate 95A to prevent the jig 10 (the plate part 20) from deforming when the jig 10 is pressed by the movable heater plate 95A. The configuration in which the second plate member 202 comes into contact with the heater plate 95A through the protrusions 202A reduces the area of contact between the second plate member 202 and the heater plate 95A. This further reduces heating of the optical fibers 1. In the fifth embodiments, the second plate member 202 includes the plural protrusions 202A located along the longitudinal direction. This keeps the plate part 20 and heater plate 95A parallel to each other even when the jig 10 (the plate part 20) is pressed by the movable heater plate 95A and is deformed. The number of protrusions 202A may be one or another number.

The bottom part 203 is a section located at the lower edges of the first plate member 201 and the second plate member 202. The bottom part 203 is a section connecting the first plate member 201 and the second plate member 202 at the lower sides. By having the bottom part 203, the plural optical fibers 1 can be retained between the first plate member 201 and the second plate member 202. In other words, by having the bottom part 203, the plural optical fibers 1 retained between the first plate member 201 and the second plate member 202 can be prevented from falling down.

Also in the fifth embodiments, the first retaining part 30 is a section configured to face the first clamp part 961 and retain a member extending from a longitudinal end of the heat shrink sleeve 7 (the plural optical fibers 1 aligned in a tape-like manner; an object to be clamped). The first retaining part 30 restricts the range of movement of the movable clamper 96A of the first clamp part 961 in the fifth embodiments as well.

Furthermore, also in the fifth embodiments, the second retaining part 40 is a section configured to face the second clamp part 962 and retain a member extending from the other longitudinal end of the heat shrink sleeve 7 (the ferrule 71 with optical fibers; an object to be clamped). The second retaining part 40 is able to retain the ferrule 71 with the jig 6 for the ferrule (specifically, the ferrule retaining part 6A) attached thereto. Herein, the second retaining part 40 retains the ferrule retaining part 6A of the jig 6 for the ferrule to indirectly retain the ferrule 71.

The second retaining part 40 of the fifth embodiments includes the bottom part 41, first abutment parts 42A, a second abutment part 42B, and the guide part (i.e., "guide") 43. The bottom part 41 is a section configured to support the ferrule 71 (and the ferrule retaining part 6A) from below.

The first abutment parts 42A are sections on which end parts of the ferrule 71 and ferrule retaining part 6A are abutted. When the end parts of the ferrule 71 and ferrule retaining part 6A are brought into contact with the first abutment parts 42A, the ferrule 71 is located at a predetermined position with respect to the jig 10. That is, the first abutment parts 42A are sections configured to control the longitudinal positions of the ferrule 71 and ferrule retaining part 6A. The first abutment parts 42A serve as a positioning part.

The second abutment part 42B is a section with which the movable clamper 96A of the second clamp part 962 comes into contact. The second abutment part 42B is a plate-like section configured to face the movable clamper 96A of the second clamp part 962. When the jig 10 is set in the heater 90, the second abutment part 42B is located between the paired clampers 96A of the second clamp part 962. When the movable clamper 96A moves and comes into contact with the second abutment part 42B, the movable clamper 96A is prevented from moving further. That is, the second retaining part 40 (specifically, the second abutment part 42B) restricts the range of movement of the movable clamper 96A of the second clamp part 962 in the fifth embodiments as well.

In the fifth embodiments, the ferrule 71 and ferrule retaining part 6A are retained on the opposite surface (the front surface) to the surface (the rear surface) of the plate-like second abutment part 42B that faces the movable clamper 96A. The second abutment part 42B therefore comes into direct contact with the clamper 96A of the second clamp part 962 to prevent the clamper 96A from pressing the ferrule 71 and ferrule retaining part 6A, thus protecting the ferrule 71.

Figure 20A:
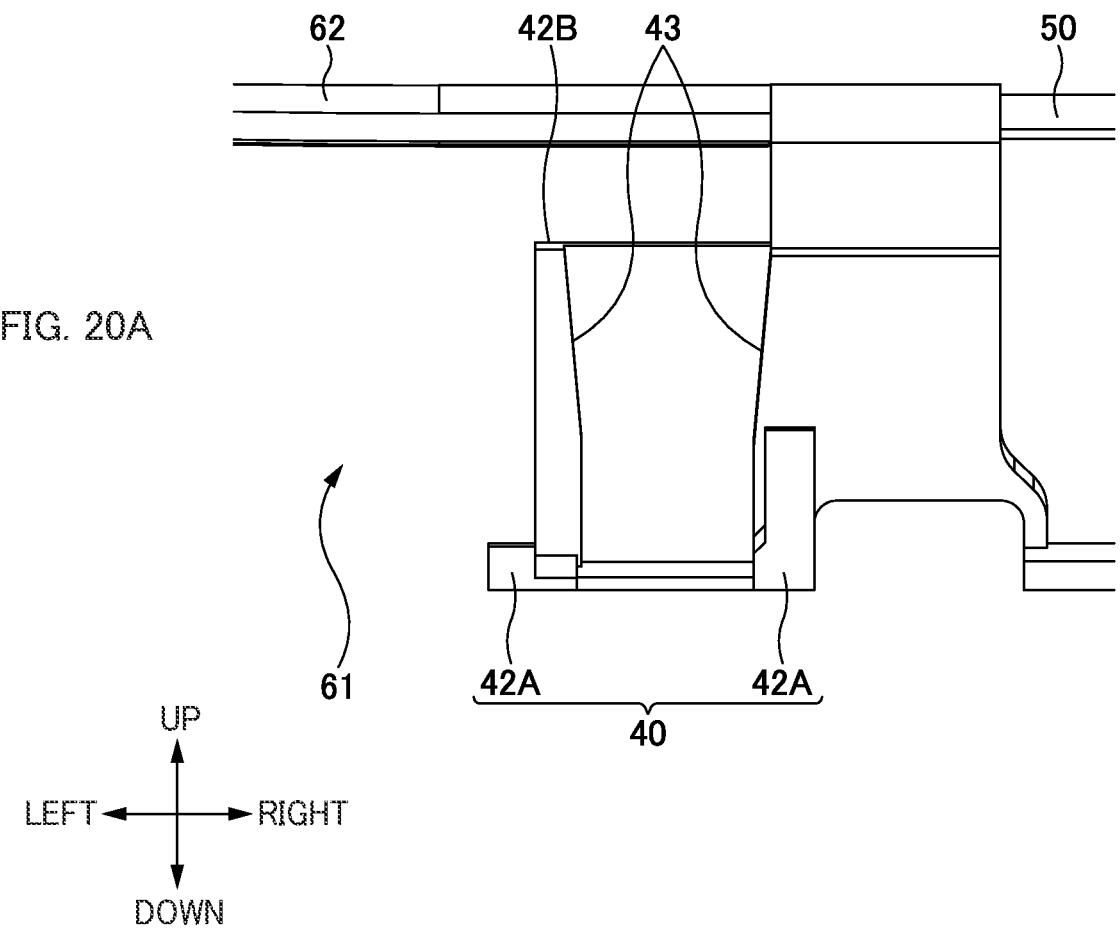
FIGS. 20A and 20B are explanatory diagrams of a guide part 43.
Figure 20B:
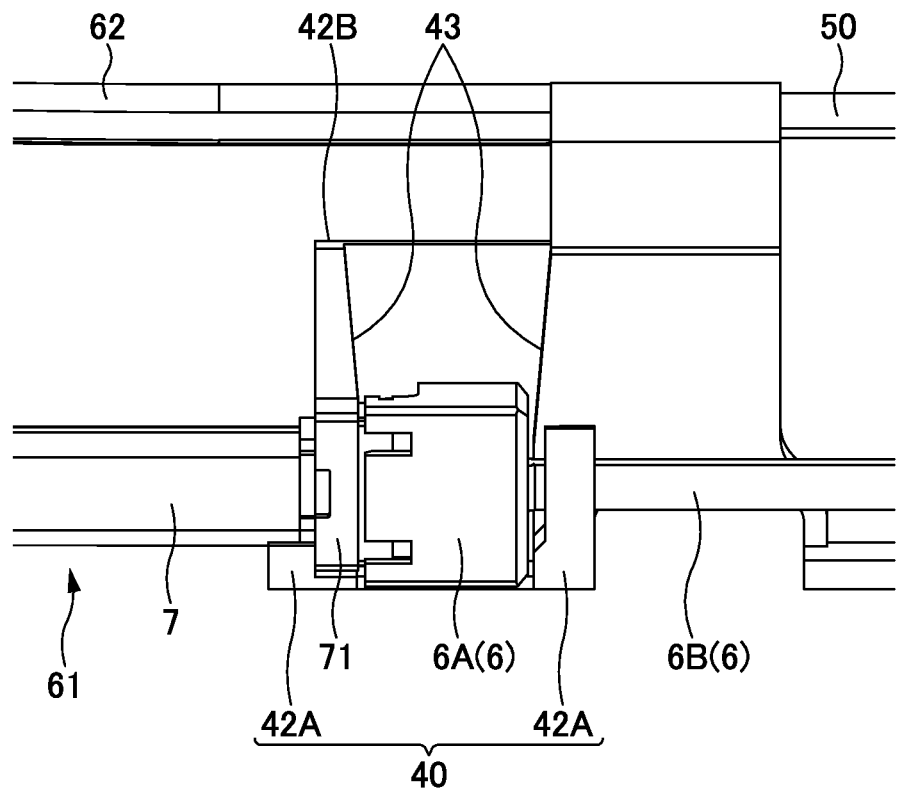

FIGS. 20A and 20B are explanatory diagrams of the guide part 43. The guide part 43 is provided on the front surface of the second abutment part 42B. The guide part 43 is a section configured to guide the ferrule 71 to a position set by the first abutment parts 42A (the positioning part). The guide part 43 is a groove-like section with the width (the longitudinal dimension) gradually decreasing downward. In other words, the guide part 43 is a section gradually controlling the position of the ferrule 71. In the process of setting the heat shrink sleeve 7 from above the insertion opening of the heater 90 in which the jig 10 is set, the operator applies tension to the fusion-splice point while inserting the ferrule 71 and ferrule retaining part 6A from above the second retaining part 40. In this process, the operator moves the ferrule 71 and ferrule retaining part 6A downward along the plate surface of the second abutment part 42B while allowing the ferrule retaining part 6A to be guided by the guide part 43. The ferrule retaining part 6A is guided by the guide part 43, and the ferrule 71 and ferrule retaining part 6A are set at a predetermined position set by the first abutment parts 42A. Provision of the guide part 43 facilitates the operation of setting the heat shrink sleeve 7 in the heater 90 and locating the ferrule at a predetermined position. The second abutment part 42B may not include the guide part 43.

In the fifth embodiments, the exposure part 61 is provided between the plate part 20 and the second retaining part 40. The exposure part 61 is a section configured to expose the object to be heated (the heat shrink sleeve 7 herein) between the paired heater plates 95A of the heating part 95. In other words, the exposure part 61 is a section configured to expose to the heating part 95, the object to be heated. The plate part 20 of the fifth embodiments is not provided in a region where the heat shrink sleeve 7 as the object to be heated is located. In the exposure part 61, the plate part 20 or the like is not located between the heater plate 95A of the heating part 95 and the heat shrink sleeve 7, and the heat shrink sleeve 7 is sandwiched and heated between the movable and fixed heater plates 95A. In the fifth embodiments, providing the exposure part 61 facilitates heating the heat shrink sleeve 7 with the fixed heater plate 95A.

The fifth embodiments include the connecting part 62. The connecting part 62 is a section connecting the plate part 20 and second retaining part 40 at a longitudinal position where the exposure part 61 is provided. In the fifth embodiments, the exposure part 61 is provided between the plate part 20 and second retaining part 40, and the plate part 20 and second retaining part 40 are not directly connected. The plate part 20 and second retaining part 40 are connected (integrated) through the connecting part 62.

When the jig 10 of the fifth embodiments is set in the heater 90, the connecting part 62 is placed on the upper surface of the rear wall part 91B of the heater 90 (see FIG. 19). The first plate member 201 connects to the connecting part 62. When the jig 10 is set in the heater 90, the plate part 20 is hung on the heater 90, and the plate part 20 is thereby set at a normal position with respect to the heater 90. If the plate part 20 is placed on the bottom surface 93A of the accommodation part 93, the jig 10 could be set with the plate part 20 tilted because of the structure where the bottom surface 93A of the accommodation part 93 is difficult to see. On the other hand, the plate part 20 is hung on the heater 90 in the fifth embodiments, and it is possible to confirm that the jig 10 is set at a normal position with respect to the heater 90 by checking the placement of the connecting part 62 on the heater 90 (specifically, on the upper surface of the rear wall part 91B).

In a similar manner, the second retaining part 40 connects to the connecting part 62. When the jig 10 is set in the heater 90, the second retaining part 40 is hung on the heater 90. The second retaining part 40 therefore can be set at a normal position with respect to the heater 90.

In the fifth embodiments, the connecting part 62 is provided so as to bridge the paired arm parts 50 provided at the right and left ends of the jig 10. In other words, in the fifth embodiments, the connecting part 62 connects the paired arm parts 50. The connecting part 62 needs to connect the plate part 20 and the second retaining part 40 but may not connect the paired arm parts 50. To locate the object to be heated between the plate part 20 and first retaining part 30, the exposure part 61 is provided between the plate part 20 and first retaining part 30, and the connecting part 62 may be configured to connect (integrate) the plate part 20 and the first retaining part 30. That is, in the configuration including the exposure part 61, the connecting part 62 may connect the plate part 20 and at least one of the first retaining part 30 and the second retaining part 40 at the longitudinal position where the exposure part 61 is provided.

As described above, also in the fifth embodiments, the jig 10 includes the plate part 20 and the first retaining part 30 and the second retaining part 40. The plate part 20 and the first retaining part 30 and the second retaining part 40 are able to restrict the range of movement of the movable portions of the heating part 95 and the clamp parts 96 (the first clamp parts 961 and the second clamp part 962). Use of the jig 10 of the fifth embodiments therefore prevents the portion of the plural optical fibers 1 within the heat shrink sleeve 7 from twisting relative to the portion of the plural optical fibers 1 in the first retaining part 30 or the portion of the plural optical fibers 1 (the optical fibers 1 retained in the ferrule 71) in the second retaining part 40 in the process of heating the heat shrink sleeve 7 having an elliptical cross-section with the heating part 95. It is therefore possible to prevent the plural optical fibers 1 aligned in a tape-like manner from being fixed in a twisted state after the heat shrink sleeve 7 is heated, thus minimizing an increase in transmission loss of the optical fibers 1.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 OPTICAL FIBER
5 TUBE
6 JIG FOR FERRULE
6A FERRULE RETAINING PART
6B OPERATION PART
7 HEAT SHRINK SLEEVE
10 JIG
11 BODY PART
20 PLATE PART
20A SUPPORT SURFACE
201 FIRST PLATE MEMBER
202 SECOND PLATE MEMBER
202A PROTRUSION
203 BOTTOM PART
21 BOTTOM PART
21A PROTRUDING PART
22 RESTRICTION PART
23 THIN WALL PART
30 FIRST RETAINING PART
30A SUPPORT SURFACE
31 BOTTOM PART
32 HOOK PART
40 SECOND RETAINING PART
41 BOTTOM PART
42 ABUTMENT PART
42A FIRST ABUTMENT PART
42B SECOND ABUTMENT PART
43 GUIDE PART
50 ARM PART
51 ENGAGEMENT PART
52 ALIGNMENT PART
53 OPERATION PART
54 HANGING PART
61 EXPOSURE PART
62 CONNECTING PART
70 OPTICAL CONNECTOR
71 FERRULE
72 HOUSING
74 SPRING
75 SPRING PUSH
76 BOOT
80 FUSION SPLICER
80A PROTRUSION PART
80B ENGAGEMENT HOLE
81 FUSION SPLICE DEVICE
81A ELECTRODE
90 HEATER
91 WALL PART
91A FRONT WALL PART
91B REAR WALL PART
92 SIDE WALL PART
92A SLIT
93 ACCOMMODATION PART
93A BOTTOM SURFACE
95 HEATING PART

95A HEATER PLATE
96 CLAMP PART
96A CLAMPER
961 FIRST CLAMP PART
962 SECOND CLAMP PART

The invention claimed is:

1. A jig for a fusion splicer mountable on a heater of the fusion splicer, the jig comprising:
   a plate part configured to be disposed between a pair of heater plates of the heater;
   a first retainer, configured to face a first clamp of the fusion splicer that is disposed outside of a heating part along a longitudinal direction of an object to be heated, and further configured to retain a first member extending from a first end of the object along the longitudinal direction; and
   a second retainer, configured to face a second clamp disposed on a side of the heating part opposite to the first clamp along the longitudinal direction, and further configured to retain a second member extending from a second end of the object along the longitudinal direction.

2. The jig according to claim 1, wherein one or both of the first retainer and the second retainer are configured to retain optical fibers aligned in a tape-like manner.

3. The jig according to claim 1, wherein one or both of the first retainer and the second retainer are configured to retain a ferrule retaining optical fibers.

4. The jig according to claim 3, further comprising a positioner that sets a position of the ferrule.

5. The jig according to claim 4, further comprising a guide that guides the ferrule to the position set by the positioner.

6. The jig according to claim 4, wherein the positioner sets the position of the ferrule by setting a position of a jig for the ferrule that retains the ferrule.

7. The jig according to claim 1, further comprising an arm part configured to keep an orientation of the plate part, an orientation of the first retainer, and an orientation of the second retainer with respect to the heater.

8. The jig according to claim 7, wherein the arm part comprises an engagement part configured to engage with the heater.

9. The jig according to claim 8, wherein the engagement part is configured to engage with a protrusion part that protrudes from a housing of the fusion splicer.

10. The jig according to claim 9, wherein
    the arm part elastically deforms, and
    the arm part is configured to release engagement between the engagement part and the protrusion part by elastic deformation.

11. The jig according to claim 1, wherein the plate part is configured to support the object along the longitudinal direction.

12. The jig according to claim 11, wherein the plate part comprises a section that has a thermal conductivity that is higher than both of a thermal conductivity of the first retainer and a thermal conductivity of the second retainer.

13. The jig according to claim 11, wherein the plate part comprises a support surface on which a surface treatment is applied and to which the object is prevented from adhering.

14. The jig according to claim 11, wherein
    the jig is mountable in an insertion opening of the heater from a predetermined direction, and
    the plate part allows the object to be inserted from the predetermined direction.

15. The jig according to claim 11, wherein
    the plate part comprises:
    a support surface configured to face the heating part and configure to support the object; and
    a bottom part disposed at a bottom of the support surface and that protrudes from the support surface toward the heating part.

16. The jig according to claim 1, further comprising an exposure part that exposes the object to the heating part.

17. The jig according to claim 16, further comprising:
    a connector at a position that corresponds in the longitudinal direction to the exposure part, wherein
    the connector is configured to connect the plate part and one or both of the first retainer and the second retainer.

18. The jig according to claim 16, wherein
    the plate part comprises:
    a first plate member configured to face a movable heating plate of the heating part; and
    a second plate member configured to face a fixed heating plate of the heating part, and
    the plate part is configured to retain a member extending from the object along the longitudinal direction between the first plate member and the second plate member.

19. The jig according to claim 18, wherein the second plate member comprises a protrusion on a surface configured to face the fixed heating plate of the heating part.

20. A heating method comprising:
    mounting a jig for a fusion splicer on a heater of the fusion splicer with a plate part of the jig facing a heating part of the heater, a first retainer of the jig facing a first clamp of the fusion splicer, and a second retainer of the jig facing a second clamp of the fusion splicer; and
    heating an object to be heated with the heating part while:
    the plate part supports the object, wherein the object has an elliptical cross-section,
    the first retainer retains a first member extending from a first end of the object along a longitudinal direction of the object, and
    the second retainer retains a second member extending from a second end of the object along the longitudinal direction.

* * * * *